US012033126B2

(12) United States Patent
Harman

(10) Patent No.: US 12,033,126 B2
(45) Date of Patent: *Jul. 9, 2024

(54) SYSTEMS AND METHODS FOR TAKE-OUT ORDER MANAGEMENT

(71) Applicant: RRT Holdings, LLC, Bellevue, CA (US)

(72) Inventor: Brett Harman, Santa Barbara, CA (US)

(73) Assignee: RRT HOLDINGS, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,854

(22) Filed: Jul. 5, 2022

(65) Prior Publication Data

US 2022/0335398 A1 Oct. 20, 2022

Related U.S. Application Data

(63) Continuation of application No. 17/329,062, filed on May 24, 2021, now Pat. No. 11,379,811, which is a
(Continued)

(51) Int. Cl.
*G06Q 20/20* (2012.01)
*G06Q 30/06* (2023.01)
*G06Q 50/12* (2012.01)

(52) U.S. Cl.
CPC ............ *G06Q 20/20* (2013.01); *G06Q 30/06* (2013.01); *G06Q 50/12* (2013.01)

(58) Field of Classification Search
CPC ......... G06Q 20/20; G06Q 30/06; G06Q 50/12
See application file for complete search history.

(56) References Cited

U.S. PATENT DOCUMENTS 5,845,263 A * 12/1998 Camaisa ................ G06Q 30/04
705/27.2
6,236,974 B1 * 5/2001 Kolawa .............. G06Q 30/0203
707/999.107
(Continued)

FOREIGN PATENT DOCUMENTS

WO 2010046727 A2 4/2014

OTHER PUBLICATIONS

Kuehn, Kathleen M., "Prosumer-Citizenship and the Local: a Critical Case Study of Consumer Reviewing on Yelp.com," The Pennsylvania State University, A Dissertation in Mass Communications, Aug. 2011, 311 pages, Pennsylvania.
(Continued)

*Primary Examiner* — Michael Jared Walker
(74) *Attorney, Agent, or Firm* — PROCOPIO, CORY, HARGREAVES & SAVITCH LLP

(57) ABSTRACT

Systems and methods for automating a take-out ordering process. In an embodiment, menu data is imported from a restaurant Point-of-Sale (POS) system over at least one network. The menu data may comprise a plurality of menu items. A menu user interface is generated. The menu user interface may comprise one or more menu screens, which comprise a subset of one or more of the plurality of menu items. A selection of at least one menu item from the subset may be received from a user. Up-sell options can be determined and provided to the user. Once completed, an order is sent to the restaurant POS system over the at least one network. The order can comprise the selected menu item(s) and any of the up-sell options selected by the user.

24 Claims, 29 Drawing Sheets

Related U.S. Application Data continuation of application No. 15/715,066, filed on Sep. 25, 2017, now Pat. No. 11,049,084, which is a continuation of application No. 13/467,966, filed on May 9, 2012, now Pat. No. 9,805,351.

(60) Provisional application No. 61/484,634, filed on May 10, 2011.

(56) References Cited

U.S. PATENT DOCUMENTS

| | | | | |
|---|---|---|---|---|
| 6,859,215 | B1* | 2/2005 | Brown | G06Q 30/06 705/26.5 |
| 7,343,174 | B2* | 3/2008 | Suryanarayana | G06Q 20/20 455/406 |
| 7,680,690 | B1* | 3/2010 | Catalano | G06Q 50/12 705/15 |
| 7,841,514 | B2* | 11/2010 | Mueller | G06Q 50/12 235/378 |
| 7,921,377 | B2* | 4/2011 | Gandolph | G11B 27/329 725/86 |
| 7,953,873 | B1* | 5/2011 | Madurzak | G06Q 30/02 709/229 |
| 8,103,540 | B2* | 1/2012 | Gross | G06Q 30/0204 705/7.33 |
| 8,146,077 | B2* | 3/2012 | McNally | G06F 16/9577 717/109 |
| 8,355,955 | B1* | 1/2013 | Mirchandani | G06Q 30/0255 705/26.1 |
| 8,494,896 | B1* | 7/2013 | Lagana | G06Q 10/10 705/7.29 |
| 8,732,028 | B2 | 5/2014 | Napper | |
| 8,775,267 | B2* | 7/2014 | Chou | G06Q 99/00 705/26.3 |
| 9,047,584 | B2 | 6/2015 | Baldwin et al. | |
| 9,269,103 | B1* | 2/2016 | Kumar | H04W 4/80 |
| 2001/0047302 | A1* | 11/2001 | Yoshinaga | G06Q 20/20 705/16 |
| 2002/0013734 | A1* | 1/2002 | Bueno | G06Q 30/06 705/26.81 |
| 2002/0019779 | A1* | 2/2002 | Healey | G06Q 30/0601 705/26.1 |
| 2002/0055878 | A1* | 5/2002 | Burton | G06Q 30/0643 705/27.2 |
| 2002/0095342 | A1* | 7/2002 | Feldman | G06Q 50/12 705/16 |
| 2002/0198790 | A1* | 12/2002 | Paulo | G06Q 30/0639 705/26.8 |
| 2003/0078793 | A1* | 4/2003 | Toth | G06Q 30/02 705/15 |
| 2003/0126016 | A1* | 7/2003 | Asano | G06Q 20/326 705/15 |
| 2004/0035644 | A1* | 2/2004 | Ford | G06Q 10/087 186/41 |
| 2004/0054592 | A1* | 3/2004 | Hernblad | G06Q 20/322 705/15 |
| 2004/0068441 | A1* | 4/2004 | Werbitt | G06Q 30/0281 705/16 |
| 2004/0148228 | A1* | 7/2004 | Kwei | G06Q 30/0623 705/26.4 |
| 2004/0158494 | A1* | 8/2004 | Suthar | G06Q 30/06 705/15 |
| 2004/0158499 | A1* | 8/2004 | Dev | G06Q 30/02 705/26.1 |
| 2005/0004843 | A1* | 1/2005 | Heflin | G06Q 50/12 705/15 |
| 2005/0075934 | A1* | 4/2005 | Knight | A23L 33/30 705/15 |
| 2005/0096997 | A1* | 5/2005 | Jain | G06Q 30/0601 705/26.1 |
| 2005/0108097 | A1* | 5/2005 | McAleenan | G06Q 30/06 705/15 |
| 2005/0171800 | A1* | 8/2005 | Yamaguchi | G06Q 50/12 715/811 |
| 2005/0177427 | A1* | 8/2005 | Mount | G06Q 30/0238 705/14.38 |
| 2005/0216300 | A1* | 9/2005 | Appelman | G06Q 30/0601 705/26.1 |
| 2006/0053061 | A1* | 3/2006 | Evans | G06Q 30/06 705/15 |
| 2006/0178943 | A1* | 8/2006 | Rollinson | G06Q 30/0601 705/26.1 |
| 2006/0206390 | A1 | 9/2006 | Asano | |
| 2006/0218043 | A1* | 9/2006 | Rosenzweig | G06Q 50/12 705/15 |
| 2007/0088624 | A1* | 4/2007 | Vaughn | G06Q 30/02 705/26.81 |
| 2007/0127691 | A1* | 6/2007 | Lert, Jr. | G06Q 99/00 379/265.05 |
| 2007/0150321 | A1* | 6/2007 | Zhao | G06Q 30/02 705/5 |
| 2007/0203801 | A1* | 8/2007 | Istfan | G06Q 50/12 705/26.1 |
| 2007/0214052 | A1* | 9/2007 | Kao | G06Q 50/12 705/15 |
| 2007/0265935 | A1* | 11/2007 | Woycik | G07F 5/18 705/26.5 |
| 2007/0276691 | A1* | 11/2007 | Grant | G06Q 10/087 705/26.1 |
| 2008/0172460 | A1* | 7/2008 | Anderson | G06Q 10/10 709/204 |
| 2008/0189172 | A1* | 8/2008 | Goren | G06Q 30/0633 705/14.23 |
| 2008/0294607 | A1* | 11/2008 | Partovi | G06Q 30/00 |
| 2009/0018916 | A1* | 1/2009 | Seven | G06Q 30/02 705/14.27 |
| 2009/0031232 | A1* | 1/2009 | Brezina | H04L 51/216 715/764 |
| 2009/0076875 | A1* | 3/2009 | Lert, Jr. | G07C 11/00 705/14.3 |
| 2009/0089183 | A1* | 4/2009 | Afram | G06Q 30/02 705/26.1 |
| 2009/0119168 | A1* | 5/2009 | Otto | G06Q 30/0601 705/26.1 |
| 2009/0150193 | A1* | 6/2009 | Hong | G06Q 30/0601 705/26.1 |
| 2009/0167553 | A1* | 7/2009 | Hong | G06Q 10/06 340/4.61 |
| 2009/0204492 | A1* | 8/2009 | Scifo | G06Q 30/0601 705/26.1 |
| 2009/0216646 | A1 | 8/2009 | Seven et al. | |
| 2009/0259718 | A1* | 10/2009 | O'Sullivan | G06Q 10/10 709/204 |
| 2009/0288012 | A1* | 11/2009 | Hertel | G06Q 20/105 715/769 |
| 2009/0319314 | A1* | 12/2009 | Good | G06Q 20/10 715/752 |
| 2010/0042506 | A1* | 2/2010 | Ravenel | G06Q 20/20 715/810 |
| 2010/0117806 | A1* | 5/2010 | Hong | G06Q 20/102 340/10.4 |
| 2010/0125490 | A1* | 5/2010 | Kiciman | G06Q 30/0207 705/14.1 |
| 2010/0161432 | A1* | 6/2010 | Kumanov | G06Q 20/102 705/40 |
| 2010/0169161 | A1* | 7/2010 | Sacco | G06Q 10/107 705/14.66 |
| 2010/0241707 | A1 | 9/2010 | Burton et al. | |
| 2010/0312385 | A1* | 12/2010 | Deuber | G06Q 30/06 177/1 |
| 2010/0312649 | A1* | 12/2010 | Lurie | G06Q 30/0269 705/14.66 |
| 2010/0324996 | A1* | 12/2010 | Kim | G06Q 30/02 705/14.66 |
| 2010/0331146 | A1* | 12/2010 | Kil | G06Q 30/02 482/8 |
| 2011/0029363 | A1* | 2/2011 | Gillenson | G06Q 30/0231 705/14.15 |

(56) References Cited

U.S. PATENT DOCUMENTS

| | | | |
|---|---|---|---|
| 2011/0040655 A1* | 2/2011 | Hendrickson | H04L 67/52 705/26.1 |
| 2011/0106664 A1* | 5/2011 | Landau | G06Q 40/12 705/26.1 |
| 2011/0125550 A1* | 5/2011 | Erhart | H04W 4/21 705/7.29 |
| 2011/0125566 A1* | 5/2011 | McLaughlin | G06Q 30/0222 705/16 |
| 2011/0218839 A1* | 9/2011 | Shamaiengar | G06Q 30/0641 705/7.32 |
| 2011/0246287 A1* | 10/2011 | Wright | G06Q 30/00 705/14.45 |
| 2011/0252121 A1* | 10/2011 | Borgs | G06Q 10/10 709/223 |
| 2011/0258058 A1* | 10/2011 | Carroll | G06Q 30/06 705/15 |
| 2011/0270662 A1* | 11/2011 | Rocco | G06Q 50/12 705/14.27 |
| 2011/0282734 A1* | 11/2011 | Zurada | G06Q 30/02 705/14.49 |
| 2011/0289433 A1* | 11/2011 | Whalin | H04L 51/52 715/753 |
| 2011/0313874 A1* | 12/2011 | Hardie | G06Q 20/306 705/26.1 |
| 2011/0313897 A1* | 12/2011 | Mulakaluri | G06Q 40/12 705/30 |
| 2011/0320250 A1* | 12/2011 | Gemmell | G06Q 30/02 705/14.1 |
| 2012/0036028 A1* | 2/2012 | Webb | G06Q 50/12 705/15 |
| 2012/0053956 A1* | 3/2012 | Martin | G16H 70/60 705/2 |
| 2012/0054002 A1* | 3/2012 | Rotbard | G06Q 30/0217 705/16 |
| 2012/0072855 A1* | 3/2012 | Baldwin | H04L 51/043 715/752 |
| 2012/0094258 A1* | 4/2012 | Langheier | G16H 20/30 434/127 |
| 2012/0116915 A1* | 5/2012 | Zheng | G06Q 50/01 705/26.7 |
| 2012/0136731 A1* | 5/2012 | Kidron | G16H 10/60 705/15 |
| 2012/0143753 A1* | 6/2012 | Gonzalez | G06Q 20/12 705/41 |
| 2012/0158589 A1* | 6/2012 | Katzin | G06Q 20/22 705/44 |
| 2012/0166210 A1* | 6/2012 | Langcaon | G06Q 30/0601 705/26.1 |
| 2012/0191522 A1* | 7/2012 | McLaughlin | G06Q 30/02 705/26.8 |
| 2012/0203619 A1* | 8/2012 | Lutnick | G06Q 30/02 705/14.1 |
| 2012/0226614 A1* | 9/2012 | Gura | G06Q 30/0605 705/44 |
| 2012/0232974 A1* | 9/2012 | Castiglione | G06Q 30/0215 705/14.21 |
| 2012/0233002 A1* | 9/2012 | Abujbara | G16H 20/60 705/15 |
| 2012/0239494 A1* | 9/2012 | Hu | G06Q 30/0207 705/14.49 |
| 2012/0239683 A1* | 9/2012 | Starkman | G06F 16/9535 707/769 |
| 2012/0246004 A1* | 9/2012 | Book | G06Q 30/02 705/347 |
| 2012/0278064 A1* | 11/2012 | Leary | G06F 40/253 704/9 |
| 2012/0303425 A1* | 11/2012 | Katzin | G06Q 20/4016 705/16 |
| 2012/0303455 A1* | 11/2012 | Busch | H04W 4/029 705/14.57 |
| 2012/0310747 A1* | 12/2012 | Calabria | G06Q 30/0631 705/14.67 |
| 2012/0323707 A1* | 12/2012 | Urban | G06Q 30/06 705/15 |
| 2013/0006733 A1* | 1/2013 | Fisher | G06Q 50/01 705/14.12 |
| 2013/0046610 A1* | 2/2013 | Abraham | G06Q 30/00 705/14.1 |
| 2013/0073454 A1 | 3/2013 | Busch | |
| 2013/0110641 A1* | 5/2013 | Ormont | G06Q 50/01 705/14.66 |
| 2013/0124314 A1* | 5/2013 | Navar | G06Q 30/0251 705/14.66 |
| 2013/0151357 A1* | 6/2013 | Havas | G06Q 50/12 705/15 |
| 2013/0179268 A1 | 7/2013 | Hu et al. | |
| 2013/0218727 A1* | 8/2013 | Lutnick | G07F 7/0886 705/26.81 |
| 2013/0226651 A1* | 8/2013 | Napper | G06Q 10/06316 701/527 |
| 2013/0332527 A1* | 12/2013 | Du | G06Q 30/0605 709/204 |
| 2014/0074743 A1* | 3/2014 | Rademaker | G06Q 30/0601 705/334 |
| 2014/0214465 A1* | 7/2014 | L'Heureux | G06Q 10/08 705/7.13 |
| 2014/0377725 A1 | 12/2014 | Kidron et al. | |
| 2015/0170099 A1* | 6/2015 | Beach-Drummond | G06Q 30/0603 705/26.81 |
| 2015/0262121 A1* | 9/2015 | Riel-Dalpe | G06Q 50/12 705/15 |
| 2016/0034845 A1* | 2/2016 | Hiyama | G06Q 10/063114 705/7.15 |
| 2016/0210602 A1* | 7/2016 | Siddique | G06T 17/00 |
| 2016/0364678 A1* | 12/2016 | Cao | G06Q 10/083 |
| 2017/0138749 A1* | 5/2017 | Pan | G01C 21/3438 |
| 2021/0158281 A1* | 5/2021 | Mimassi | G06Q 10/0832 |

OTHER PUBLICATIONS

Extended European Search Report received in related European patent application No. 12781638.7, dated Sep. 10, 2014, 7 pages.
Patent Examination Report No. 1 issued in related Australian Patent Application No. 2012253419. dated Jul. 25, 2016, (3 pages).
International Search Report and Written Opinion dated Nov. 23, 2012 in related International Application No. PCT/US2012/037370 (13 pages).
Office Action for related European Patent Application No. 12781638.7 dated Oct. 16, 2017; 8 pages.
Office Action for related Canadian Patent Application No. 2,834,875 dated Dec. 27, 2017; 3 pages.
Petition for Inter Partes Review Under 35 U.S.C. § 311 Et Seq. and 37 C.F.R. § 42.100 Et Seq. (Claims 1-22 of U.S. Pat. No. 9,805,351), dated Sep. 30, 2020; 93 pages.
Declaration of Jeremy Glassenberg, Before the Patent Trial and Appeal Board, Nuonosys EX1004, dated Sep. 20, 2020; 220 pages.
Agreement by Parties on Mandatory Initial Disclosures Pursuant to 37 C.F.R. § 42.51(a)(1); Case IPR2020-01706 U.S. Pat. No. 9,805,351, Before the Patent Trial and Appeal Board, Jan. 19, 2021; 3 pages.
Patent Owner RRT Holdings, LLC.'s Preliminary Response to Petition for Inter Partes Review; Case IPR2020-01706 U.S. Pat. No. 9,805,351; Jan. 19, 2021, 66 pages.

* cited by examiner

Select your security privilege [Please select admin level] [*] or New security privilege [_____] (e.g. S1, S2)    [Save Changes] [Cancel Changes]

☐ Menu Manager
☐ categories           ☐ products price manager   ☐ options name manager    ☐ options values manager    ☐ attributes controller
☐ option name          ☐ option values ☐ Online Order

☐ Reports Manager
☐ stats products viewed    ☐ stats products purchased    ☐ stats customers    ☐ stats products lowstock    ☐ stats customers referrals
☐ stats sales report       ☐ stats revenue report ☐ Security Manager
☐ admin                ☐ admin control
☐ Help ☐ Company Manager
☐ group ordering       ☐ company division    ☐ company stores group ☐ Restaurant Manager
☐ cuisine              ☐ geo zone            ☐ information         ☐ rrt zone ☐ Promotion Manager
☐ price promotions     ☐ rewards program     ☐ coupon admin        ☐ coupon restrict ☐ New Order

☐ Order Manager
☐ orders               ☐ invoice             ☐ fax email

FIG. 5

| Information | Geography | Cuisine | Import | | | | |
|---|---|---|---|---|---|---|---|
| Information | | | | | | | |
| Financial | Hours | Rules | Fees | Edit | Add | Inactive | |

Restaurant Name

ABC - Dallas 2

☐ Set As Default
☐ Inactive Restaurants
Choose by Division ▼
Choose by Group ▼

ABC - Dallas 2
ABC - Dallas 4
ABC - Store 1125
ABC - Metroplex
ABC - Downtown

Information - Hours

Restaurant Hours of Operation

| Meal Time | | Mon | Tue | Wed | Thu | Fri | Sat | Sun |
|---|---|---|---|---|---|---|---|---|
| Breakfast | Open | 11:00 a | 11:00 a | 11:00 a | 11:00 a | 11:00 a | 11:00 a | 00:00 |
| | Close | 2:30 p | 2:30 p | 2:30 p | 2:30 p | 2:30 p | 2:30 p | 00:00 |
| Lunch | Open | 5:00 p | 5:00 p | 5:00 p | 5:00 p | 5:00 p | 5:00 p | 00:00 |
| | Close | 9:00 p | 9:00 p | 9:00 p | 9:00 p | 10:00 p | 10:00 p | 00:00 |
| Dinner | Open | 5:00 p | 5:00 p | 5:00 p | 5:00 p | 5:00 p | 5:00 p | 5:00 p |
| | Close | 5:00 p | 5:00 p | 5:00 p | 5:00 p | 5:00 p | 5:00 p | 5:00 p |

Save / Update

Restaurant Marketing / Other Fees

| | Add | Edit | Inactive |
|---|---|---|---|

☐ Inactive Fees

| Fee Name | Fee Calculation | Fee Amount |
|---|---|---|
| Container Fee | $ On Each Order | $ 1.50 |
| Curbside Tip | % On Food Only | 5% |
| Delivery Marketing Fee | $ On Each Order | $ 1.00 |

Choose Fee Calculation ▼

Name of Fee
[_____]

☐ Charge Fee For Pick up Orders
☐ Charge Fee For Curbside Orders
☐ Charge Fee For Delivery Orders
☐ Calculate Restaurant Sales Tax on Fee Use This Sales Tax % For Fee
[_____]

Fee comments
[_____]

[ Save / Update ]

Extra Fees On Payment Method

Name of Payment Fee

| Payment Method | % | $ |
|---|---|---|
| ☐ Credit Card 1 | | |
| ☐ Credit Card 2 | | |
| ☐ Credit Card 3 | | |
| ☐ Checks | | |
| ☐ House Account | | |
| ☐ Gift Card/Cert | | |

☐ Calculate Restaurant Sales Tax on Fee

Save / Update

| Last Order | Orders | Total $ | Avg. $ |
|---|---|---|---|
| 10/24/2009 | 35 | $1,826 | $52.17 |

[ History/Duplicate ] [ Promotions ] [ Adjustments ]

Temp Instructions (This Order)    Perm Instructions (All Orders)

Customer ▼     ☐ Block Orders
               ☐ Tax Exempt

[ Cancel ]  [ Save Customer Information ]

FIG. 14

| Regular Menu | Catering Menus |

Appetizers

- Appetizers
- Soups
- Salads
- Sandwiches
- Specialties
- Pizzas
- Pastas
- Desserts
- Beverages
- ABC kids
- Catering

| Item Name | Price |
|---|---|
| Cabo Crab Cakes New This Month<br>Handmade, Pan-sautéed blue crab cakes served with freshly made roasted corn & black bean salsa and a roasted red pepper aioli. | $10.79 |
| Singapore Shrimp Rolls<br>Shrimp, baby broccoli, soy-glazed shiitake mushrooms, spinach, carrots, rice noodles, bean sprouts, green onion and cilantro wrapped in rice paper.... | $8.49 |
| Tuscan Hummus<br>Our original recipe of Tuscan white beans puréed with sesame, garlic, lemon and spices. Garnished with Italian parsley, fresh Roma tomatoes, basil... | $6.49 |
| Torrtilla Spring Rolls - Choose 2<br>Hand-rolled flour tortillas sprinkled with herbs and baked in our pizza oven. Choose 2 from the following: MEDITERRANEAN Sautéed Portobello.... | $7.99 |
| Torrtilla Spring Rolls - Choose 3<br>Hand-rolled flour tortillas sprinkled with herbs and baked in our pizza oven. Choose 3 from the following: MEDITERRANEAN Sautéed Portobello.... | $10.49 |
| Lettuce Wraps<br>Minced Chicken and/or shrimp, wok-seared with Shiitake mushrooms, water chestnuts and green onions in a soy ginger sauce. Served on a bed of crispy... | $8.99 |
| Avocado Club Egg Rolls<br>A fusion of East and West with fresh avocado, chicken, tomato, Monterey Jack cheese and applewood smoked bacon. hand-wrapped in a crispy wonton roll... | $9.79 |
| Sonora Rolls<br>Grilled lime chicken, roasted corn & black bean salsa, Cheddar and Monterey Jack cheeses, fire-roasted mild chilies, green onions and cilantro... | $9.79 |

FIG. 15A

Cabo Crab Cakes $10.79

Handmade, pan-sautéed blue crab cakes served with freshly made roasted corn & black bean salsa and a roasted red pepper aioli. Served with two side dishes. Add Guacamole for $1.99

Ingredients

Shredded Napa cabbage with fresh avocado, julienne cucumbers, daikon, edamame, carrots, red cabbage, green onions, cilantro, crispy rice noodles and crisp wontons.

Food Allergies

Crab and pecan crusted.

Portions

2 Crab Cakes with side sauce

Other/Should Know

Some people find the black beans salsa a bit spicy.

Try These Too!

Chicken Walnut Sandwich — $7.99 — Add To Order ~1304

Chicken Walnut Sandwich — $7.99 — Add To Order

Item Qty: 1

Name (Optional)

Comments/Instructions

Choose 2 Side Dishes? (Click each one)
- Caesar Salad
- Green Beans
- Corn Chowder
- Baked Beans
- French Fries
- Baked Potato - Add $1.99

Choose 1 Dipping Sauce?
With Herb Ranch

Choose Extras/ Add-Ons?
- ☐ Xtra Ranch Dip Sauce - $.50
- ☐ Xtra Italian Dip Sauce - $.50
- ☐ Xtra BBQ Dip Sauce - $.50
- ☐ Add Guacamole - $1.99
- ☐ Xtra Salad Dressing - $.50

Add To Order

FIG. 15C

Curbside Order

ABC Kitchen - Hollywood & Highland

6801 Hollywood Blvd Hollywood, CA 90000

323-111-1111  Directions

Today January 17, 2009  12:45 pm

View Your Food Order

John Doe 515-222-2121

Black 2 door

Credit Card 1 xxxx-xxxx-xxxx-5545  10/10 451

| | |
|---|---|
| Food & Beverage Total | $57.43 |
| Sales Tax 6.25% | $3.58 |
| Total Due At Restaurant | $61.01 |

Hello John Smith
☑ My Profile    ☐ Oops! I'm not John! Log Out

◉ ORDER NOW!

Edit Group Order

Restaurant: ABC Baking Company
View Menu
Delivery Date: 12/9/2009
Change
Delivery Time: 1:15 PM
Change
Order Edit Cutoff: 12/9/2009 at 12:00 PM Direct Invite Link: [https://website.mywebsite.com]   view Per-person $ Limit: No Limit
Change
Current Order Total: $45.91
View detail
Payment Method: Cash
Change

[Cancel Order]   [Lock and Finalize]

Invite a Colleague...
create more colleagues

Current Group Members
○ John Doe           ▷ ◎ ✕
○ Abraham            ▷ ◎ ✕
○ Wilson             ▷ ◎ ✕

Re-send invitation to all

FIG. 23A

Payment Method:

Dollar Amount Limit Per Person: [NO LIMIT ▼]
Group Order Payment Distribution:
  ◉ Pay for all items together
  ○ Each person will pay for their own food
Pay with: [Cash ▼]

FIG. 23B

Custom Order Message

This message will show up as additional information in the email to the invitees.

[                              ]

Group Members
◎ John Doe
◎ Abraham
◎ Wilson

FIG. 23C

SYSTEMS AND METHODS FOR TAKE-OUT ORDER MANAGEMENT

RELATED APPLICATIONS INFORMATION

This application is a continuation of U.S. application Ser. No. 17/329,062, filed on May 24, 2021, which is a continuation of U.S. application Ser. No. 15/715,066, filed on Sep. 25, 2017, now U.S. Pat. No. 11,049,084, issued on Jun. 29, 2021, which is a continuation of U.S. application Ser. No. 13/467,966, filed May 9, 2012, now U.S. Pat. No. 9,805,351, issued on Oct. 31, 2017, which claims priority under 35 U.S.C. 119(e) to U.S. Provisional Patent Application No. 61/484,634, filed May 10, 2011, the disclosures of both of which are incorporated herein by reference in their entireties as if set forth in full.

FIELD OF THE INVENTION

The systems and methods disclosed herein relate generally to take-out ordering management, and particularly, to systems and methods for improved management and profitability of take-out ordering.

BACKGROUND

Conventionally, if someone wishes to place a take-out order at a restaurant, that person can call the restaurant, place the order with an employee stationed inside the restaurant, and drive and pick up the order once it is ready. Take-out ordering represents a large portion of the restaurant industry in terms of dollars. For example, in 2010, the restaurant industry did approximately six-hundred (600) billion dollars in revenue, of which twelve percent (12%), or roughly seventy-two (72) billion dollars was from take-out ordering. Moreover, there was a ten percent (10%) growth in this segment in 2010. Accordingly, take-out ordering represents a significant and important component of the overall restaurant industry.

Unfortunately, this segment is typically managed in such a way as to actually diminish the potential revenue gains that can be achieved. For example, most restaurants do not have a dedicated system or staff for handling take-out orders. As a result, whichever employee is handling a customer's call is likely being distracted from his or her normal job. Moreover, the restaurant can often be busy, noisy, etc., which hinders communication of the take-out order between the customer and restaurant employee. Furthermore, the configuration and capabilities of the order entry and telephony technology within a restaurant are typically not up to standard for order-taking activities. This can result in a difficult or unsatisfying ordering experience, incorrect orders, long hold times, dropped calls, and the like. In fact, ninety percent (90%) of all take-out orders arrive incorrectly. This can result in unhappy and even lost customers. Moreover, the employee is must less likely to try and up-sell the customer, further reducing the potential revenue and profitability of the take-out segment.

SUMMARY

Accordingly, systems and methods are disclosed to facilitate and improve the take-out ordering process. In an embodiment, a system for automated take-out ordering is disclosed. The system comprises at least one executable software module that, when executed by at least one hardware processor, imports menu data from a restaurant Point-of-Sale (POS) system over at least one network, wherein the menu data comprises a plurality of menu items, generates a menu user interface comprising one or more menu screens, wherein the one or more menu screens comprise a subset of one or more of the plurality of menu items, receives a selection of at least one menu item from the subset of menu items from a user, determines one or more up-sell options, provides the one or more up-sell options to the user, and sends an order to the restaurant POS system over the at least one network, wherein the order comprises the selected at least one menu item and any of the one or more up-sell options selected by the user.

In another embodiment, a method for automated take-out ordering is disclosed. The method comprises importing menu data from a restaurant Point-of-Sale (POS) system over at least one network, wherein the menu data comprises a plurality of menu items; generating a menu user interface comprising one or more menu screens, wherein the one or more menu screens comprise a subset of one or more of the plurality of menu items; receiving a selection of at least one menu item from the subset of menu items from a user; determining one or more up-sell options; providing the one or more up-sell options to the user; and sending an order to the restaurant POS system over the at least one network, wherein the order comprises the selected at least one menu item and any of the one or more up-sell options selected by the user.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 illustrates an example user interface for administration of roles and permissions of an order management authority, according to an embodiment;

FIGS. 7-12 illustrates example user interfaces for managing a restaurant profile, according to an embodiment;

FIGS. 13-19 illustrate example user interfaces for completing a restaurant order, according to an embodiment;

FIG. 20 illustrates a process for managing a take-out menu, according to an embodiment;

FIGS. 21A-21D illustrate example user interfaces for managing a take-out menu, according to an embodiment;

FIGS. 23A-23D illustrate example user interfaces for generating a group order, according to an embodiment;

DETAILED DESCRIPTION

It should be understood that the embodiments described herein are by way of example only, and are not intended to limit the embodiments or implementations of any aspect of the invention, including architectures and process flows.

Figure 1:
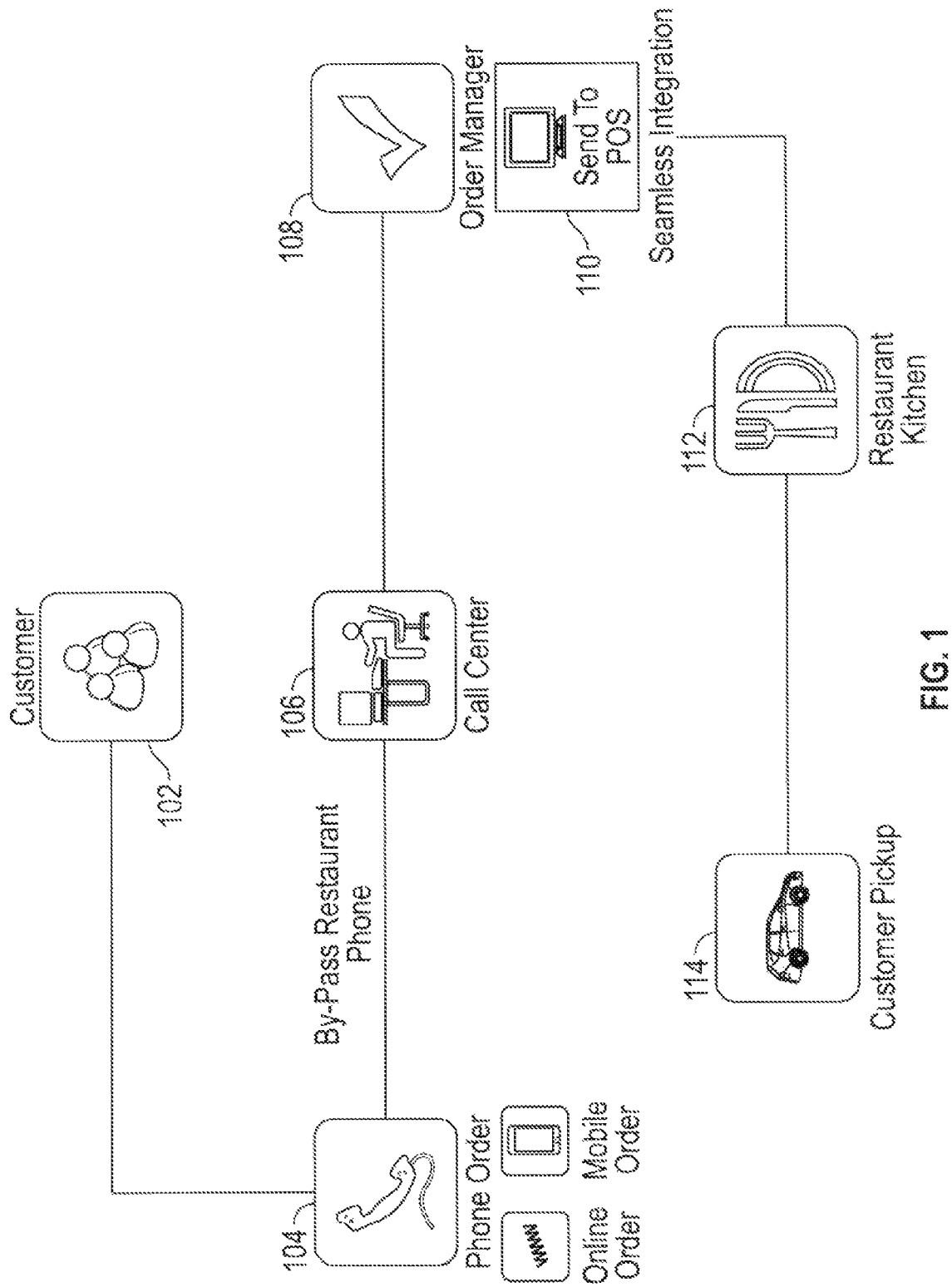
FIG. 1 illustrates an example process flow for managing a take-out order process, according to an embodiment.

FIG. 1 is a diagram illustrating an example process flow that can be used to manage a take-out order process, according to an embodiment. As illustrated, a customer 102 can call a call center 106 using a phone order process 104. The customer 102 may dial a number associated with a particular restaurant (e.g., a local restaurant), and the call may be seamlessly routed to call center 106. The customer 102 may not even know that his or her call has been routed. In an alternative embodiment, the customer 102 may call the call center 106 directly.

A customer service representative (CSR) at call center 106 will receive the call from customer 102, and process the customer's order using, or with the assistance of, an order management module 108. The order management module 108 may be a software application residing on a computer system that is either local to the CSR (e.g., desktop or workstation) or remote from the CSR. In an embodiment, the order management module 108 may be remote from the call center 106 as well. In such an embodiment, order management module 108 may reside on a remote server, and be accessed by the CSR via at least one network using software on a desktop, workstation, or other computing device that is local to the CSR. For example, the remote server may comprise a web server which serves a user interface (e.g., web pages in Hypertext Markup Language (HTML)) to the CSR over a network (e.g., the Internet) via a standard web browser executing on the CSR's device. Alternatively or additionally, the remote server may comprise a web service which serves data to a client application installed on the CSR's device using, for example, Extensible Markup Language (XML). It should be understood that call center 106 can be interfaced with a local or remote system comprising a plurality of modules and functions, of which the order management module 108 can be but one, which allows the CSRs to manage the process of take-out ordering, and which interfaces with the POS systems of one or more restaurants. This allows restaurants and companies to manager their menus and process flows, generate reports, and the like.

The order is sent by the CSR or by the order management module 108 to the associated restaurant's Point-of-Sale (POS) system 110, such that the order can be placed and the bill generated within the restaurant's system. The order may be sent over the Internet or other network using standard protocols. The POS system may be integrated with the kitchen 112 for order fulfillment. In step 114, the customer picks up the order from the restaurant.

In this manner, the take-out ordering process may be removed from the restaurant and its employees. This alone, can significantly reduce problems and increase revenue by eliminating distractions, hold times, dropped calls, and other problems that lead to bad customer experiences and/or lost revenue. In addition, the CSRs can be fully trained on the menus, specials, preferences of customers, trends, and the like, such that they can actually enhance the customer experience and increase sales through up-selling, offering suggestions, making the customer aware of special offers, and the like. As a result, the process illustrated in FIG. 1 can enhance revenue derived from the take-out ordering process.

In an alternative or additional embodiment, online or mobile ordering can be supported. In such an embodiment, the customer can interface with the order management module 108 or similar module directly, instead of through a CSR. The module may comprise or communicate or interface with a web-based or mobile-application-based user interface. Using an application on a desktop, laptop, tablet, smart phone, or other non-mobile or mobile personal computing device, a customer can input an order into a graphical user interface provided by the module. For example, the application may be a conventional browser and the order management module 108 or other module can serve web pages over the Internet or other network to the customer's device. The module may be able to serve different web pages depending on the destination (e.g., call center, non-mobile device, or mobile device). The web pages may comprise selectable menu options and/or input fields into which a customer can enter order information. The web pages or other graphical user interface may also comprise up-sells, suggestions, special offers, and the like, which are displayed or offered during one or more stages of the order entry process.

The customer may then submit the order information, for example, by posting the information over the Internet or other network to a servlet of a web server on a remote server or servers (e.g., the same servers hosting the order management module 108). Once the order has been submitted, the process may proceed as discussed above, wherein the order management module 108 or other module sends the order information to the associated restaurant's POS system 110.

Figure 2:
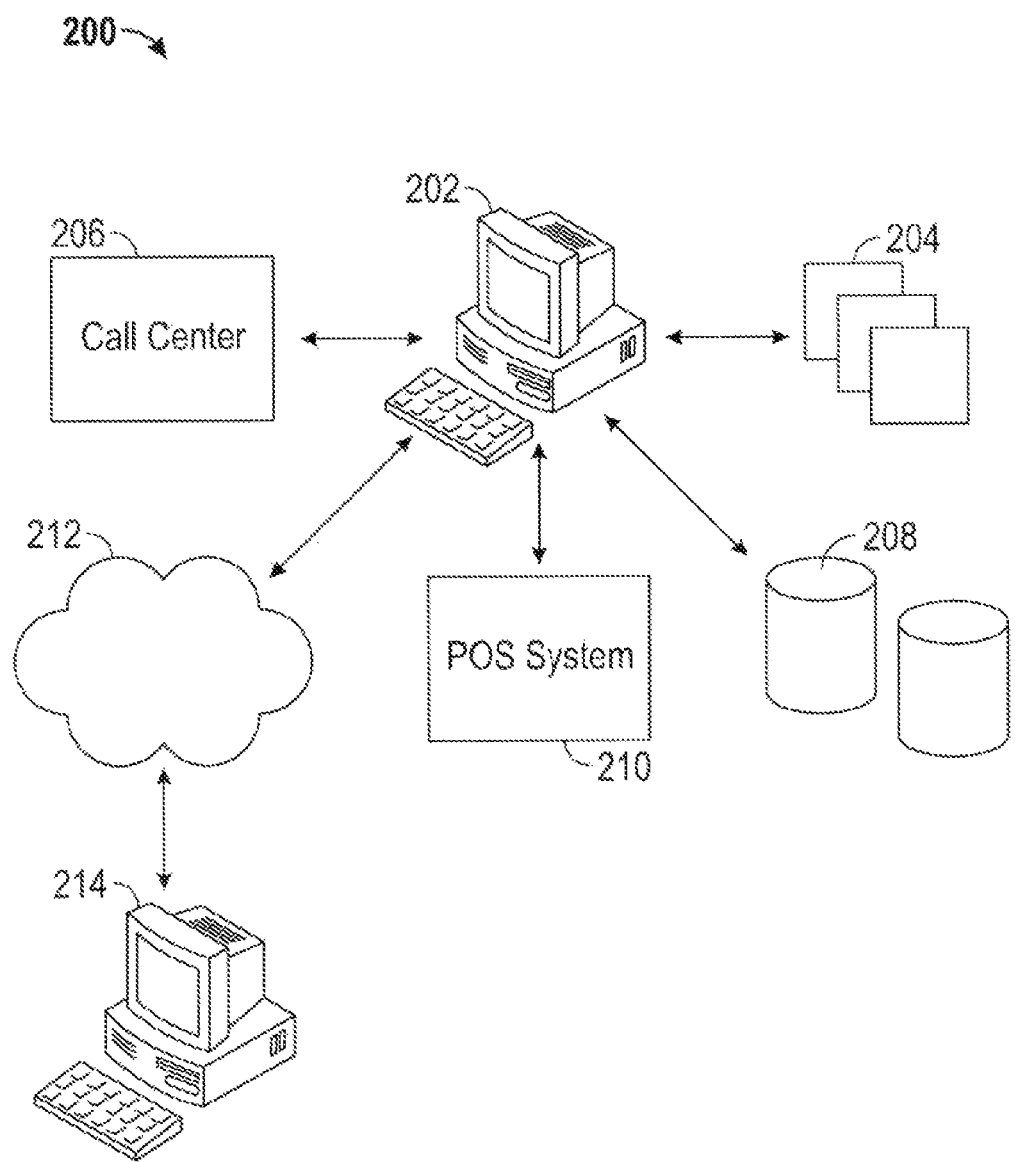
FIG. 2 illustrates an example take-out order management system, according to an embodiment.

FIG. 2 illustrates an example take-out order management system, according to an embodiment. At the heart of system 200 is order management authority 202. The term "authority" is intended to refer to one or more of a variety of different resources required to carry out the functions and processes described herein. These resources may include, without limitation, servers, processors, co-processors, memory, databases, routers, programs, routines, software modules, applications, user interfaces, displays, and the like. It will be understood that these resources can include one or multiple servers, computers, processors, routers, and the like, which can be located in one place or distributed among different locations and possibly across different geographic regions.

Order management authority 202 can be interfaced with or include a plurality of functional modules 204 that may be configured to manage various processes and information. Authority 202 can also be interfaced with or include one or more databases 208, which can store and provide data, information, instructions, and the like for authority 202. Authority 202 can also be interfaced with one or more restaurant POS systems 210. Users, such as administrators, CSRs, and/or customers, may access authority 202 using a terminal 214, which is connected to authority 202 either directly or via a network 212, which may comprise one or more intranets, virtual private networks (VPNs), and/or the Internet (including the World Wide Web). Authority 202 can also be interfaced with or can host a social networking site.

Figure 3:
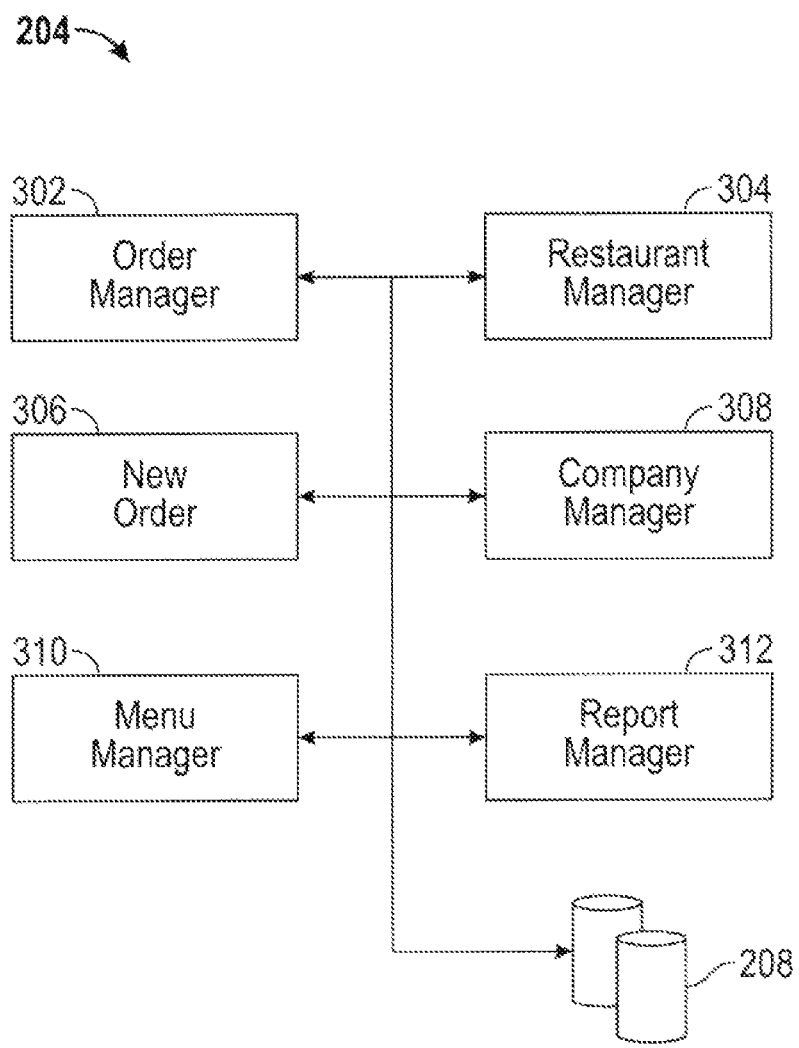
FIG. 3 illustrates example modules of an order management authority, according to an embodiment.

FIG. 3 illustrates example modules of an order management authority, according to an embodiment. For example, the modules 204 of order management authority 202 in FIG. 2 can comprise an order manager 302, a restaurant manager 304, a new order manager 306, a company manager 308, a menu manager 310, and a report manager 312. In addition, the order management authority 202 may also comprise an administration module or modules (not shown). Each of these modules can include sub-modules. Also, it should be understood that the arrangement of modules and sub-modules, illustrated in FIG. 3 and described herein, is only for illustration purposes, and that different configurations of modules are contemplated, including configurations with more or fewer numbers of modules. One or all of the modules can be communicatively coupled to database(s)

208. In addition, in certain embodiments, some or all of the software modules can use Secure Socket Layer (SSL) or other conventional encryption technologies.

As used herein, the term "company" refers to a corporate entity, such as a restaurant for which take-out orders are managed. The term "restaurant" refers to a specific location of a particular restaurant owned by a company. "Customer" refers to a customer of a company or restaurant. "Client" refers to a company or restaurant which utilizes the disclosed systems and processes.

Administration Module

In order to facilitate administration of the system, an administrator module or modules can be provided. Different types of login can be provided, including, without limitation, administration login, company login, and CSR login. Administration login provides access for administrators (e.g., call center administrators, software administrators, etc.) of the overall order management authority. One Uniform Resource Locator (URL) can be provided (e.g., www.yourOMA.com/admin). When an administrator logs in through the administration login, he or she may be able to see all companies and restaurants which are clients of the order management authority. The administrator may also have access to all or a subset of the software, databases, and/or database records of the authority.

Figure 4:
FIG. 4 illustrates an example user interface for managing corporate profiles, according to an embodiment.

Using the administration module, the administrator can add and remove companies and set up a company profile database. For instance, FIG. 4 illustrates a graphical user interface for managing company profiles, according to an embodiment. The user interface can allow an administrator to view and edit company information, including, without limitation, company name(s), corporate address, corporate telephone and fax numbers, corporate contact person and contact information, corporate website, corporate logo, and the like.

The administrator can also set up login credentials for company administrators. Call center administrators may be permitted to set up user login's for each company or restaurant for which the call center will be answering calls. It should be understood that administrators can be given different roles and/or permissions, and have access to different subsets of resources (e.g., companies, restaurants, databases, etc.) as defined by those roles and/or permissions. FIG. 5 illustrates a graphical user interface for managing roles and permissions, according to an embodiment. An administrator can add and remove administrators and assign preset administrative levels to the administrators, or create new administrative levels. The preset or custom administrative levels can comprise sets of permissions, such as access permissions to specific modules of the order management authority.

Company login provides access for company-specific or restaurant-specific administrators. For example, each company or restaurant location may have an administrator who is charged with configuring company-specific or restaurant-specific settings. One URL can be provided for all company and restaurant logins (e.g., www.yourOMA.com/company or yourOMA.company.com). Company administrators can set up logins for specific restaurant personnel or other company employees. Company login provides access to the software, databases, and/or database records, which are specific to the company or restaurant. In an embodiment, administration and company CSR login provides access for CSRs. Access can be granted to CSRs for a specific restaurant, restaurant group, different restaurants, etc. As with the other login types, one URL can be provided for CSR logins (e.g., www.yourOMA.com/company or yourOMA.company.com). In an embodiment, administration login and company login provides access to all software modules, whereas CSR login only provides access to the new order and order management modules only.

In an embodiment, when an administrator is logged in, he or she can be presented with a graphical user interface comprising a header display with image icons or text links to available software modules. As discussed above, the software modules may comprise order manager, restaurant manager, new order, company manager, menu manager, and/or report manager modules.

Order Management Module

The order management module 302 can provide a graphical user interface to facilitate order management. The graphical user interface may comprise a row or grid layout or other layout displaying fields for one or more take-out orders. Each order may correspond to one row, and each row may comprise one or more fields, including, without limitation, one or more of the following fields:

Order type. For example, order type may be one of "pick-up" and "curbside." Text or a small image icon or color box can be used to indicate the type of order, and distinguish it from other types.

Date. This field is the date that the order was entered into the system or processed.

Order Number. The order number may be a unique and/or sequentially-assigned number or character string. In an embodiment, each company can be assigned their own set of number sequences or assignment algorithm. Alternatively, the same number sequence or assignment algorithm can be used for all companies in the system. In an embodiment, a code which is unique to a company can be pre-pended or appended or otherwise incorporated into the order numbers. For example, if the company name is Acme Restaurant Company, each order number associated with the company can comprise the code "ACR" in conjunction with a sequentially-assigned number (e.g., ACR12526).

Version. The version indicates the number of times that the order has been edited or modified, and/or the number of times that the order has been sent to the restaurant (e.g., to the restaurant POS system).

Order Amount. This field is the total dollar amount of the order, including food, restaurant-added fees, sales tax, delivery fees, etc.

Age. This field is the actual age of the order. It can comprise a count-up clock, which starts at zero (0) when the order is submitted either by the CSR or order management module (e.g., by the customer via a web page), and counts up (e.g., in minutes and/or seconds) until the order is completed.

Restaurant. This field comprises the name of the restaurant to which the order is being or has been sent.

Customer Type. Customer type can comprise a code indicating the type of customer. In an embodiment, the customer type can comprise residential (e.g., "R"), business (e.g., "B"), hotel/motel (e.g., "H"), catering (e.g., "C"), pharmaceutical representative ("P"), etc.

Customer Name. This field can comprise the customer's first and last names.

Company/Hotel. This field can comprise the company or hotel name.

Address. This field is the street address of the customer location. If the order involves delivery, the address can comprise the delivery address. Otherwise, and alternatively, the address field can comprise the billing address (e.g., of a credit card used to pay for the order).

City. This field comprises the city of the customer's location.

State. This field can comprise the two letter state code or full state code of the customer's location. Since some people are not familiar with all of the two-letter state codes, in an embodiment in which two letter state codes are used, a popup can be utilized to show the corresponding state name, possibly, as a list of all state codes and corresponding state names.

Zip Code. This fields comprises the Zip Code of the customer's location.

Phone Number. This field comprises the customer's main contact phone number.

Pick-up Time. This field comprises the pick-up time, which may either be set manually by the CSR or customer during the order placing process, or automatically based on the time that the order is submitted and a preparation time which may be designated by the restaurant. For example, if an order is placed at 1:00 PM and the restaurant designates an estimated preparation time of 25 minutes, the pick-up time can be set as 1:25 PM.

Order Times. This field shows all the times associated with the order process.

First Operator. For embodiments in which a call center is used, the first operator field comprises the name or other identifier of the CSR who entered the initial order.

Last Operator. For embodiments in which a call center is used, the second operator field comprises the name or other identifier of the CSR who last edited the order.

In an embodiment, as an order progresses through the ordering process, each row can indicate the step of the process in which it is in, for example, using color-coding or other indications. For example, each step or status can correspond to a different color or other indication. Such steps or status can include, without limitation, one or more of the following:

(a) New Phone Order. This status indicates that a new order has been placed by a CSR or via an online or mobile application (e.g., through a website).

(b) Advanced Phone Order. This status indicates that an advanced order was placed by a CSR or via an online or mobile application. The date of the order as well as the pick-up or delivery time can be manually entered by the CSR or customer.

(c) Send Order. This status indicates that the order has been sent to the restaurant, either to the restaurant's POS system, or by fax, email, etc.

(d) Confirm Order. This status indicates that it has been verified that the order was actually received by the restaurant. Verification can be performed via a confirmation from the restaurant (e.g., by electronic message, email, phone, fax, etc.). Where manual entry is performed, a popup box can be provided for manual entry of the restaurant personnel's name who is confirming receipt of the order.

(e) Order Complete. This status indicates that the order has been completed, i.e., the order has been paid for and/or received by the customer.

In an embodiment, the list of orders can be filtered. The system can be national and CSRs can handle different time zones, restaurant groups, cites, states, etc. Thus, the company administrator and/or call center administrator may be permitted to set the view of orders for each CSR. For example, checkboxes and/or drop-down menus can be provided and selected by the administrators. These inputs can specify and activate filters, including without limitation: all orders today, orders tomorrow, advanced orders, by restaurant, by city, and/or by state.

The user interface of the order management module can provide action buttons or other inputs to facilitate management of the list of orders. These inputs can include, without limitation, one or more of the following:

View Order. The user can highlight an order and/or click a button or link associated with a specific order to view the order with all information.

Edit Order. The user can highlight an order and/or click a button associated with a specific order to edit and save an order.

Send Order. The user can highlight an order and/or click a button or link associated with a specific order or group of orders to send the order(s) to the restaurant for order preparation. Order may be sent according to sending rules, as discussed below. When orders are sent, the restaurant may receive two copies of the order: one for the restaurant and one for the customer.

Confirm Order. The user can highlight an order and/or click a button or link associated with a specific order to activate a popup or other interface displaying a phone number or speed dial number associated with the restaurant and/or an address of the restaurant, and an input field for entering a name of the person at the restaurant who confirms receipt of the order.

Complete Order. The user can highlight an order and/or click a button or link associated with a specific order to show that the order is complete.

Change Restaurant. The user can highlight an order and/or click a button or link associated with a specific order to activate an input (e.g., textbox, choice box, drop-down, etc.) that enables the user to select a different restaurant to which the order should be switched. In an embodiment, the input only comprises restaurants with the same group of restaurants (e.g., chain restaurants within the same company).

Cancel Order. The user can highlight an order and/or click a button or link associated with a specific order to cancel an order. In an embodiment, if the user chooses to cancel the order, an input (e.g., textbox, choice box, drop-down, etc.) pops up for entering or selecting a reason for the cancellation. There may be a time limit (e.g., from time of order submission, or transmission to the restaurant) for a CSR to cancel an order, after which the CSR can no longer cancel the order. Such a time limit allows a restaurant to designate a time period, after an order has been sent to the restaurant, after which the order cannot be canceled.

Fax Customer Order. The user can highlight an order and/or click a button or link associated with a specific order to fax an order to a customer. In an embodiment, if the user chooses to fax the order, an input pops up for entering a customer fax number, to which the order is faxed.

Fax Menu. The user can highlight an order and/or click a button or link associated with a specific order to fax a restaurant menu to a customer. In an embodiment, if the user chooses to fax the menu, an input pops up for entering a customer fax number, to which the associated restaurant's menu is faxed.

Figure 6:
FIG. 6 illustrates an example user interface for managing orders, according to an embodiment.

FIG. 6 illustrates an example graphical user interface provided by an embodiment of the order management module. A grid of orders 608 lists fields for the date, order number, amount, age, version, restaurant location, pick-up time, sent time, delivery driver, customer name, address, telephone number, and CSR associated with the order. In some instances, the field comprises a link to information. In the illustrated embodiment, the user interface comprises a search box 602 for searching orders, e.g., using keyword matching. The user interface also comprises filters 604 for filtering the order list 608 by time period, order type, and status.

The order management authority can handle faxing. Alternatively, a third party can handle the faxing, and the order management authority can interface with the third party via an application programming interface (API). Orders can be faxed to a restaurant using a fax number which can be set in the restaurant manager module 304. In an embodiment, fax commands can return an error message if the fax was not sent or received properly. The error message may comprise a reason why the fax was not properly sent or received.

Restaurant Management Module

The restaurant management module 304 facilitates the management of restaurants which utilize the order management authority for take-out order processing. For example, an administrator can use the restaurant management module to add, delete, or otherwise modify restaurants in the system and/or information associated with the restaurants in the system.

In an embodiment, the restaurant management module 304 can enable an administrator to set information, such as hours, geographical zones, fees, taxes, and the like, for each restaurant. For instance, FIG. 7 illustrates an example graphical user interface, according to an embodiment, through which an administrator can set daily open and close hours for breakfast, lunch, and dinner.

Figure 8:
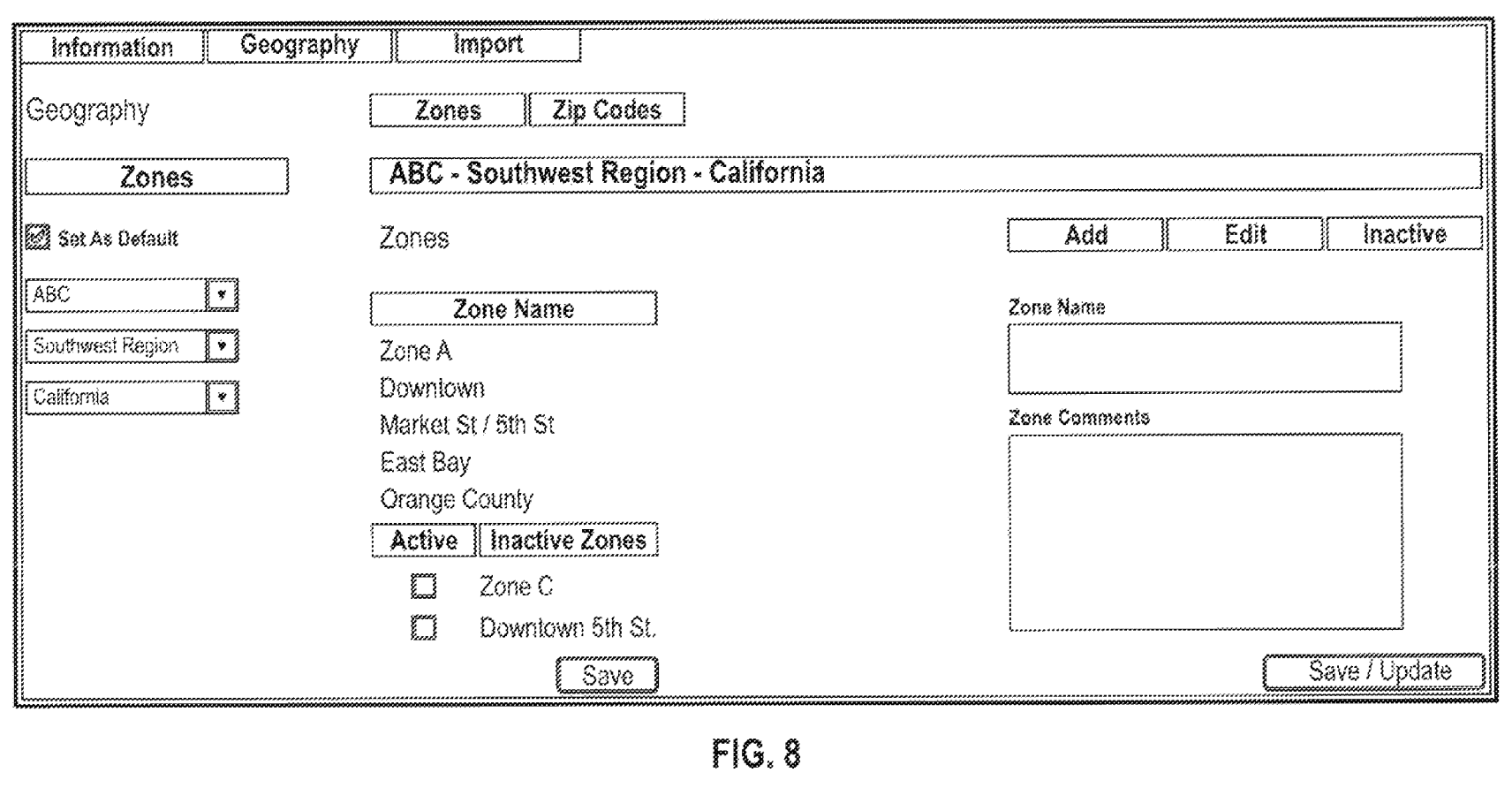
Figure 9:
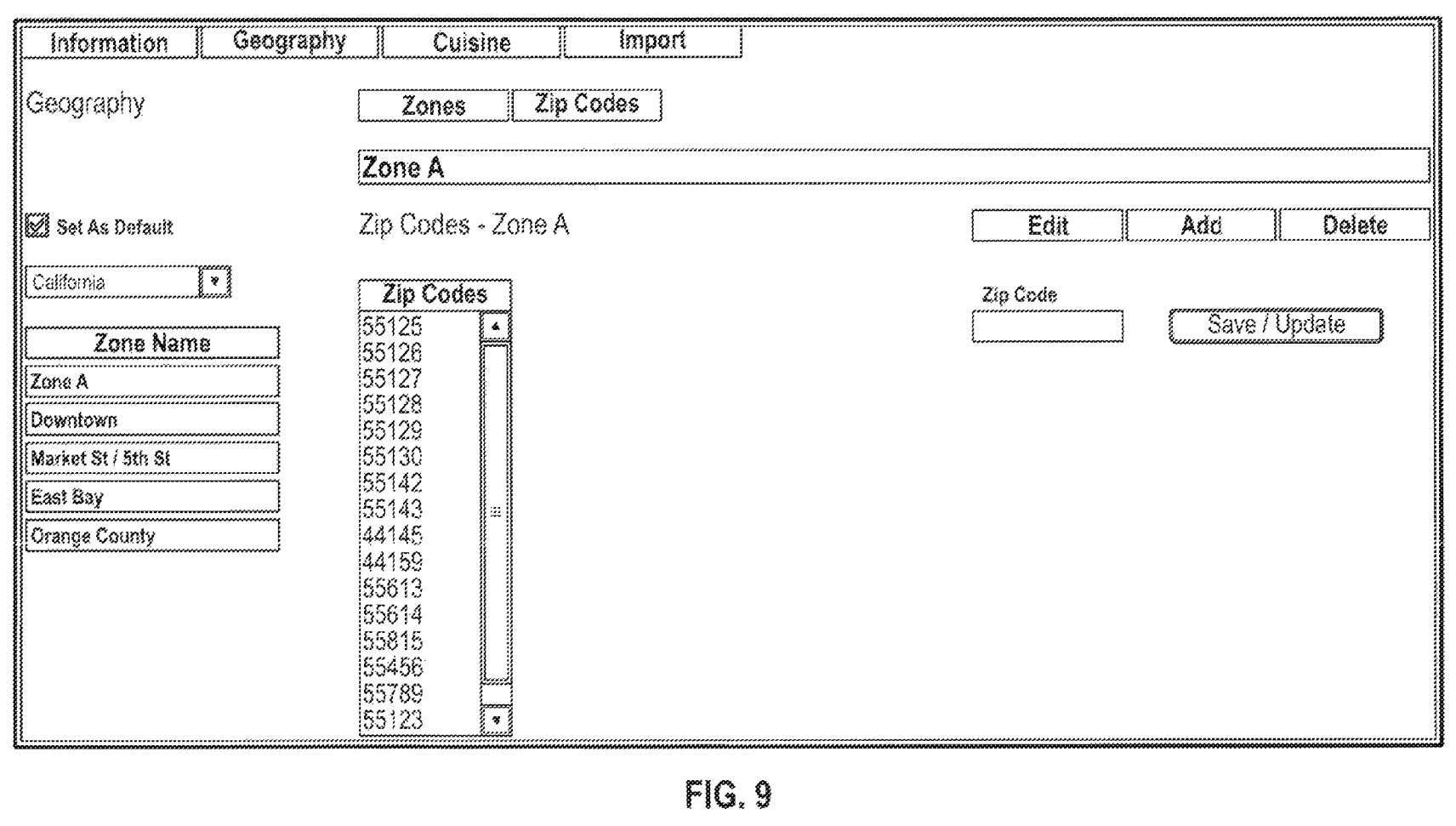

FIG. 8 illustrates an example graphical user interface, according to an embodiment, through which an administrator can create, edit, or delete geographical zones. An administrator can input a name and/or description for a geographical zone. In an embodiment, zones can be associated with geographical boundaries. For instance, as illustrated in FIG. 9, Zip Codes can be assigned to zones using a graphical user interface. Once a zone has been created and can be associated with a restaurant location or a group of restaurant locations to facilitate a restaurant selection during the ordering process. For example, if a CSR or customer searches for a restaurant location based on an address of the customer, the order management authority can identify a Zip Code within or associated with the address, determine which zone the Zip Code falls within, and retrieve the restaurant location or locations associated with that zone.

Figure 11:
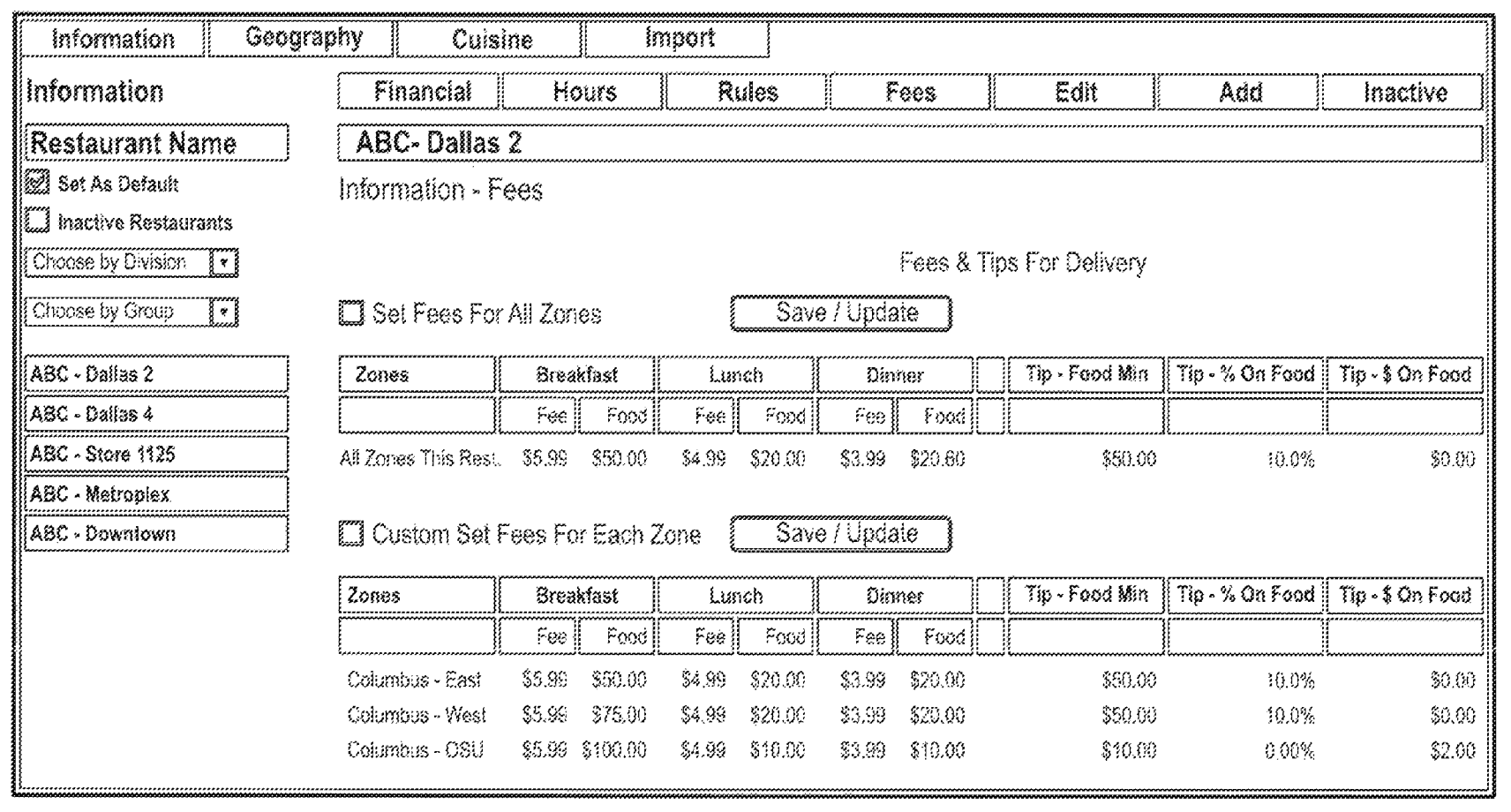

FIG. 10 illustrates an example graphical user interface, according to an embodiment, through which an administrator can add fees associated with a restaurant and/or group of restaurants. For instance, an administrator can create a new fee, set a fee calculation method (e.g., fixed amount, percentage of order, etc.), fee amount (e.g., dollar amount, percentage, etc.), fee name, fee description, whether sales tax should be calculated on the fee, and/or, if sales tax should be calculated, the applicable sales tax percentage or amount. In an embodiment, the administrator can also choose an order type to which the fee applies (e.g., pick-up orders, curbside orders, delivery orders, etc.). FIG. 11 illustrates a graphical user interface, according to an embodiment, through which an administrator can view and set fees and required gratuities for delivery. In this example, the fees can be set independently for breakfast, lunch, and dinner orders. The fees may also be conditional. For example, the fee or required gratuity may only apply to orders that are under a threshold dollar amount.

Additionally or alternatively, fees can be associated with a payment method. For example, FIG. 12 illustrates a graphical user interface through which an administrator can select one or more payment methods to which a fee should apply, as well as the percentage or dollar amount of the fee, and whether sales tax should be calculated on the fee.

In an embodiment, sending rules can be set for specific restaurant locations. The sending rules can be set up prior to order management, and selected for each restaurant via an input (e.g., radio buttons) associated with each restaurant in a user interface of the restaurant management module 304. For example, the sending rules may comprise, without limitation, one or more of the following:

Send Now. According to this rule, once the order is entered and/or displayed in the order management module 302, it is automatically sent to the restaurant (e.g., to the restaurant's POS system, fax number, and/or email address). A set delay (e.g., 60 seconds) can occur between the entry of the order and the time at which it is sent to the restaurant. Alternatively, the order can be sent immediately after entry. Sub-rules or criteria may be set and applied to each order to determine whether the order should be sent according to this rule. For instance, a maximum and/or minimum dollar amount may be set, such that only orders which fall below the maximum or above the minimum are sent according to this rule. Further criteria may include a minimum customer order and an order origin. For example, the rule may set so as to only apply to phone orders, Internet orders, or all orders.

Hold Time. According to this rule, the order is held and then sent automatically after a period of time set by the restaurant. The hold time may be set as any amount or selected from a range of amounts (e.g., 2 minutes to 60 minutes). This rule can be set for orders that are to be completed within the same business day as the order is placed. The rule may also comprise sub-rules or criteria. For example, the rule may be set to apply up to a maximum/minimum dollar amount, all orders, one or more order types (e.g., pick-up, curbside, delivery, etc.), and/or one or more time periods, such as peak time periods (e.g., 6:30 AM to 7:15 AM for breakfast, 11:30 AM to 12:45 AM for lunch, 6:00 PM to 7:30 PM for dinner) or off-peak time periods. For example, one hold time rule can be set for peak hours (e.g., a 15 minute hold time) and a different hold time rule can be set for off-peak hours (e.g., a 3 minute hold time).

Advanced Order. Using these rules, a restaurant can set how much time it wants for all advanced orders. In an embodiment, times can be set from between 2 minutes and 48 hours. Different rules can be set for same-business-day advanced orders (e.g., the order is placed at 9:30 AM via an online order and the customer requests pick-up at 11:45 AM) and non-same-business-day advanced orders (e.g., the order is placed at 9:30 AM via an online order and the customer requests to pick-up the order at 11:45 AM tomorrow). Sub-rules or criteria can be set, including maximum/minimum dollar amount, order type, peak time periods, off-peak time periods, and the like.

Manual Send. If manual send is set, no rules apply. The order is sent when a user of the order management module manually selects to send the order, e.g., via a button or link associated with the order. The "Send" button or link may be viewed as a universal button to manage all manual send functions for all orders displayed by the order management module 302.

Thus, two methods, i.e., automatic or manual, can be used to send orders to restaurants. The automatic method is determined by the business rules set for and/or by each restaurant. The manual method is determined by a user interaction with the user interface of the order management module 302. It should be understood that the actual transmission of the order from the order management module 302 or other module to the restaurant can be the same in both methods. For example, messages comprising the order information (e.g., in XML or other format) may be queued and then sent by a network interface of the order management authority.

Automatic orders which fail because of connection errors with the restaurant's POS system or other errors can be flagged (e.g., highlighted or otherwise distinguished from non-failed orders) by the order management module 302. In the event of a failure, the order can be automatically re-sent (e.g., 3 times per minute). If the failure persists after a certain period of time or a certain number of attempts to re-send the order, the order can be removed from the message queue. In this case, the order may need to be manually sent by a user of the order management module 302.

In addition to sending rules, business rules can also be set for each restaurant or group of restaurants. If any of the business rules are not met with respect to a particular order, the order can be flagged in a user interface of the order management module 302. For example, the business rules may comprise, without limitation, one or more of the following:

Send Options. The default may be set to the "Send Now" rule discussed above, so that all orders for this restaurant are automatically sent to the restaurant. However, an administrator may choose a different send rule to use.

Food Preparation Before Open. The default may be "Call Restaurant for Approval." An error message can be included for this field, if the restaurant is chosen for an order and does not fit within the criteria. In this case, the order may need to be manually dealt with.

Preparation Time. This is the estimated time required to prepare an order. The default may be set to 15 minutes.

Drive Time. The default may be set to 10 minutes.

Order Per Hour. This is the amount of orders a restaurant can handle in an hour. The default may be based on the set preparation time (e.g., if the preparation time is 15 minutes, the order per hour can be set to 4, i.e., 60 minutes/15 minutes).

Minimum Dollar Amount Per Order. The default may be set to $1.

Maximum Dollar Amount Per Order. The default may be set to $100.

Add Food and Add Preparation.

Advanced Orders. This indicates whether the restaurant accepts advanced order. The default may be set to "yes."

Canceled Orders. This indicates whether the restaurant allows cancellation of orders. The default may be set to "yes."

New Order Entry Module

The new order entry module 306 enables entry of an order by a CSR and/or by a customer directly (e.g., via a user interface of a web page). In an embodiment, online or mobile ordering is performed through a separate module than call center ordering.

In embodiments, in which a CSR operates the new order entry module 306 to take an order from a customer, for example, over the phone, the module may give the CSR an option to search for customer information. For example, the CSR may be able to search for a customer using one or more of a phone number, first name, last name, and/or company name. If the correct customer is returned by the search, the CSR can select to begin the food order. Otherwise, if the correct customer or no information is returned by the search, the CSR can select to add a new customer.

Figure 13:
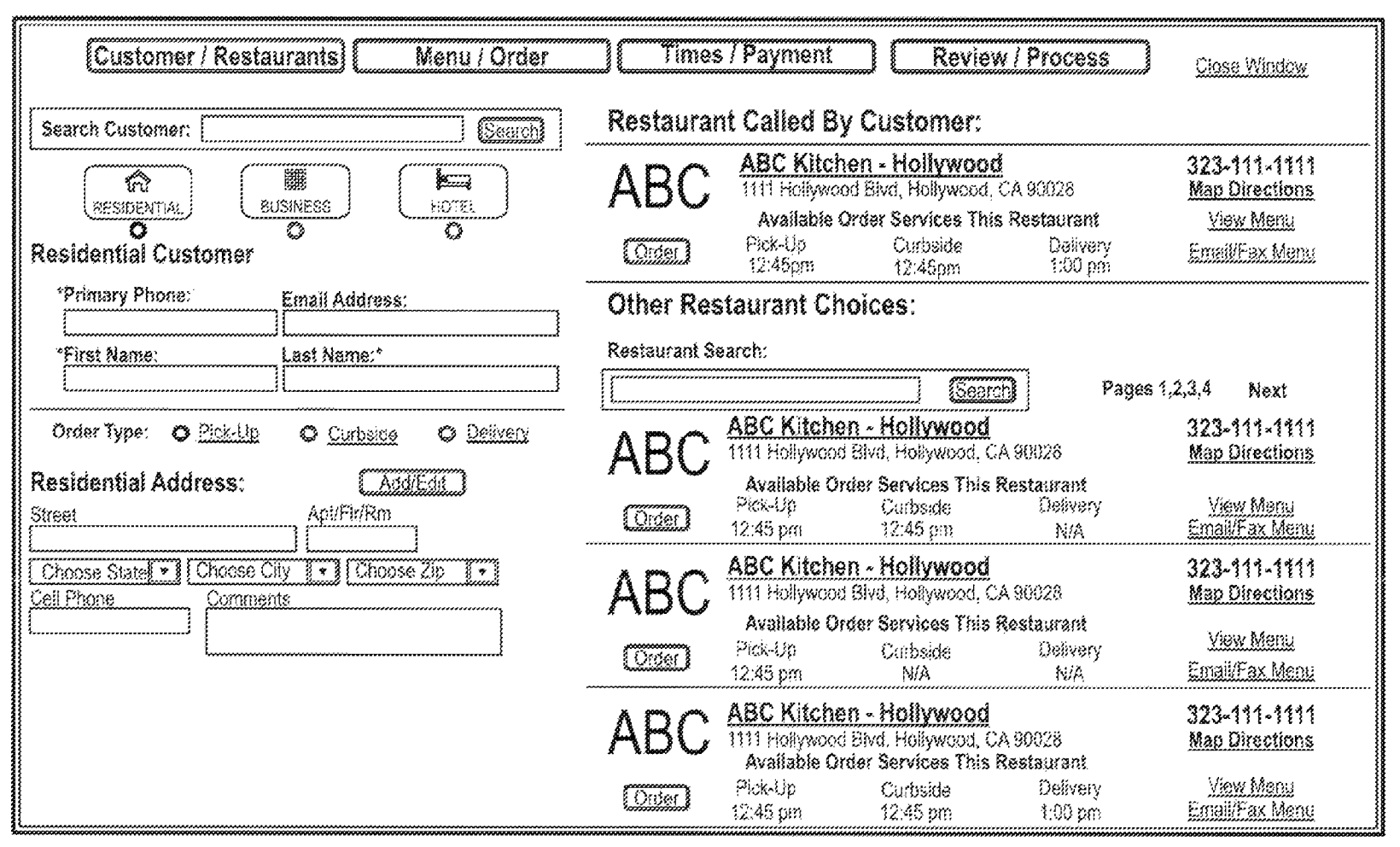

FIG. 13 illustrates an example graphical user interface, which enables a CSR to search for a customer, as well as enter information for a new customer. The interface displays restaurant information (e.g., link to website or further details, address, phone number, link to directions, available order types, etc.) for the restaurant which the customer called and through which the call to the call center was routed. If a customer was a prior customer and is found and selected in a search by the CSR, a history of previous orders made by the customer can be displayed to the CSR, as illustrated in FIG. 14. The CSR may be provided with the option to duplicate an order if the customer desires, as well as enter temporary (for this order only) or permanent instructions (for this order and future orders) on behalf of the customer.

If the CSR selects to add a new customer, the CSR can be prompted by the new order entry module 306 for customer information, including without limitation customer type, first name, last name, company/motel, hotel guest name, hotel guest room number, address, suite/floor/room, city, state, Zip Code, telephone number, email address, mobile phone number, order type choice, building name, and/or a pharmaceutical representative checkbox. Customer type can comprise, for instance, residential, business, hotel/motel, catering, and/or pharmaceutical representative. Furthermore, the exact combination of customer information inputs presented to the CSR via the user interface may depend on the selected customer type. In other words, different fields may be requested for different customer types.

Once a customer has been selected or entered, a list of restaurant locations can be displayed by the user interface to the CSR. The list of locations can be derived by the new order entry module 306 based on the customer's address. The CSR may select a restaurant from the list. The user interface may also comprise a map (e.g., using Google Maps), which shows the location of each restaurant in the list and/or the selected restaurant. The user interface may also provide textual and/or graphical directions from the customer's address to the restaurant's location. The user interface can also display which order type services (e.g., pick-up, curbside, delivery, etc.) are offered by each of the restaurants in the list. Once all order information has been entered, the CSR can select to send the order to the restaurant (e.g., to the restaurant's POS system) for fulfillment.

In embodiments in which the new order entry module 306 comprises online ordering functionality, a wizard-like series of screens can be presented directly to customers. For example, this can be implemented via web pages (e.g., ASP web pages) which the customer is able to retrieve and view using a standard browser executed on a computing device. One or more web page of a website may be provided to the customer, which allows the customer to find the closest restaurant location (e.g., using a street address, cross streets, city, state, Zip Code, etc.), register with the website to obtain credentials (e.g., username/email address and password) for logging in to the website, log in to the website, and/or view a corporate menu. The customer may also be permitted to search for restaurant locations based on order type (e.g., pick-up, curbside, delivery, etc.).

A list of restaurants meeting the criteria input by the customer (e.g., address, order type, etc.) can be displayed. For example, the list may comprise the restaurants geographically closest to the customer's specified address which offer an order type selected by the customer. If the order type is delivery, only one or two restaurant locations may be displayed based on their Zip Codes and other geographical settings set forth in a geography management module.

The list may comprise information for each restaurant and/or a link to information for each restaurant. The information may comprise the address and telephone number for the restaurant, as well as a link to view the restaurant's menu (e.g., as a PDF file). The information may also comprise driving directions (e.g., via Google Maps, MapQuest, etc.). The information may also comprise a button or link that, when activated, initiates order processing (e.g., an "Order Now" button).

Placement of an order by a customer can follow the same logic as an order entered by a CSR. A user interface comprising one or more screens (e.g., multiple screens presented in succession) can be presented to the customer (e.g., via dynamic or static web pages of a website). The user interface may comprise multiple inputs for selecting menu items and the time and date for pick-up of an order. If different menus are available at different times of day (e.g., breakfast, lunch, and dinner menus), the particular menu presented to the customer may be based on the entered or selected pick-up time. The customer may also have the option to select from a particular menu (e.g., catering menu, happy hour menu, specials menu, etc.).

For example, FIG. 15A illustrates an example menu screen which may be provided to a CSR or customer. In the illustrated example, the user can select the type of menu (i.e., regular or catering). Furthermore, for each menu, the user can select from a plurality of categories or screens, such as "Appetizers," "Soups," Salads", and the like.

Figure 15B:

The user can then select a menu item. As illustrated in FIG. 15B, a graphical user interface can be provided which provides the user with information about the menu item, such as ingredients, allergens, and the like. This information may be added through the menu management module 310. Inputs can be provided for entering a quantity of the menu item to be purchased, selecting available options, comments, and the like. As a user adds menu items to the order, the order details can be shown and updated in a section of the user interface, including on all menu screens. This interface can also be used to up-sell the customer, for example, by offering side dishes which may be added and/or suggesting food pairings or other menu items which the customer may enjoy. FIG. 15O illustrates an alternative interface to the one shown in FIG. 15B, where up-sell items 1302 are shown and associated with inputs 1304 which enable the user to add the items to the order.

After a customer has entered his or her order, the customer may be prompted to either log in or register with the order management authority or other system interfaced with the order management authority. If a customer registers with the authority, the authority generates a user profile associated with the customer. The profile comprises customer information input by the customer during the registration process, such as name, credentials for authentication (e.g., username/email and password), contact information, billing information, customer type (e.g., residential, business, catering, hotel/motel, pharmaceutical representative), and the like. Alternatively or additionally, the customer may be permitted to submit the order without registering or establishing a profile with the system.

Figure 16:

The customer may be prompted to choose or input a payment method, prior to submitting the order for fulfillment. For example, the user interface may comprise an input through which the user can choose to pay by credit card, debit card, gift certificate, at pick-up, etc. If the user chooses to pay for the order online, the user interface may also comprise inputs for entering payment information (e.g., credit card number, expiration date, billing address, etc.). FIG. 16 illustrates an example graphical user interface, according to an embodiment, through which the user can specify a pick-up time including advanced pick-up times, payment type (e.g., cash, credit card, check, house account, gift card, etc.), and payment information.

Figures 17, 18:
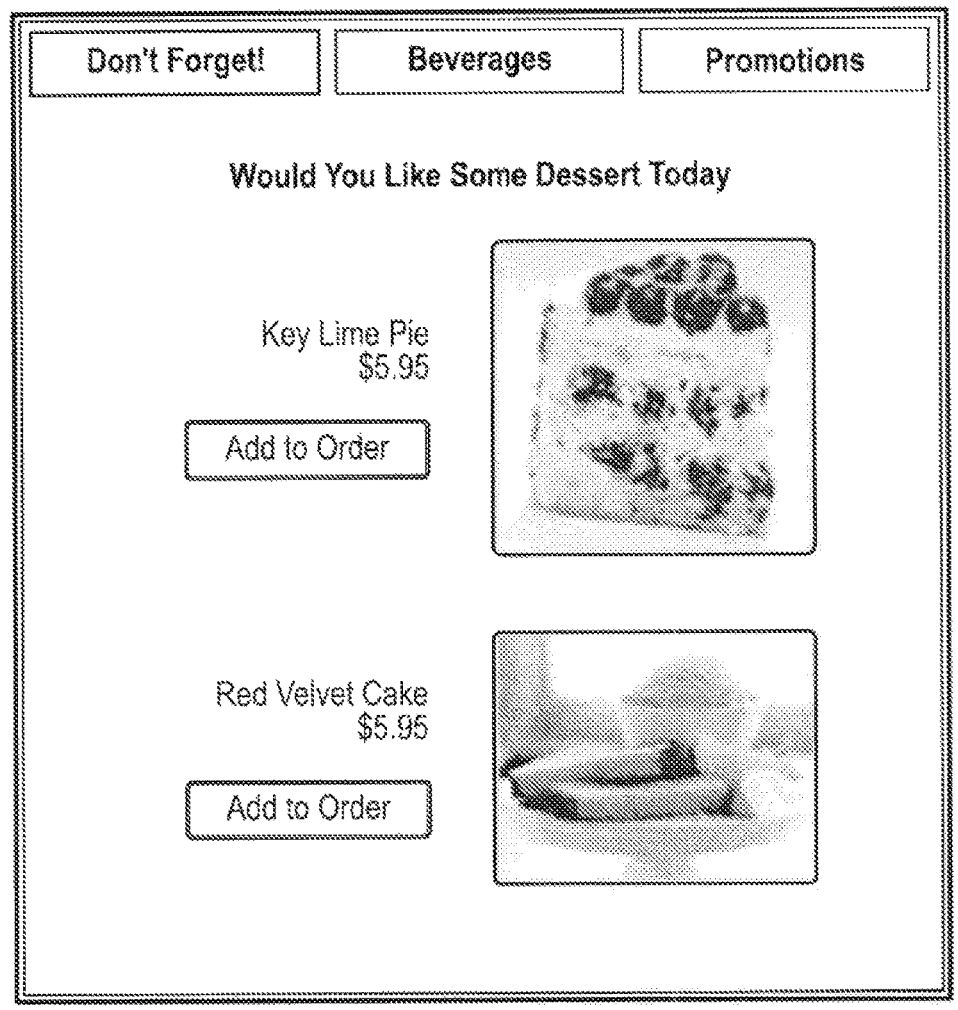

Prior to submitting the order, the user interface may prompt the customer to confirm the order. For example, a screen may be provided which shows the complete order information and a button or link to confirm the order, as demonstrated in FIG. 17. The screen or any prior screen (e.g., payment method screen, prior to payment method screen, etc.) may also present up-sell opportunities. For example, the screen may present the user with additional selectable menu items (e.g., desserts, sides, beverages, etc.), which he or she can add to the order, as illustrated in FIG. 18. The screen may also comprise selectable promotions offered by the restaurant to qualified customers. These up-sell and promotional selections may be designated by the restaurant or company, for example, through the menu management module 310.

Figures 19, 20:
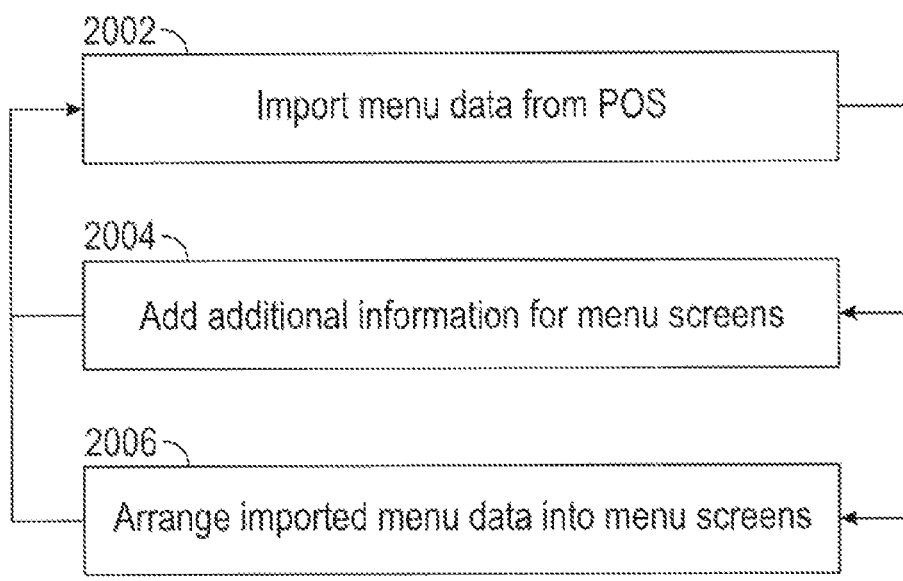

Once the customer confirms the order, for example, by clicking a button or link to process the order, the order is sent to the restaurant. The order may be sent to a POS system of the restaurant for entry into the restaurant's internal management system. The order information may be sent using XML or other format. A confirmation screen can be displayed to the user, and/or an email confirmation, which may comprise order information, can also be sent to the customer's email address. FIG. 19 illustrates example confirmation content, which may be included in a web page or email, according to an embodiment. As illustrated, the confirmation can include the order type, restaurant information, including links to the restaurant's website and/or directions to the restaurant, the date of the order, order details and/or a link to order details, the name of the customer, customer information, payment information, the cost of the order, and the like.

In an embodiment, if a customer registers with the order management authority or other system interfaced with the order management authority, at least a portion of the customer's past order history can be stored. When a user logs in to the system, he or she may be given an option to select a past order to be repeated as a current order or as a template for a current order. In this manner, the ordering process can be made faster and more efficient for repeat customers.

Delivery Management Module

The order management authority may also comprise a delivery management module. If a restaurant location supports delivery, the user interface of the new order entry module 306 may also include an input for entering a delivery address.

The delivery management module can include a driver management module, which manages available delivery drivers. For each such driver, the driver management module may receive, store, and manage fields such as name, address, telephone number (e.g., home, mobile, pager, etc.), Social Security number or Employee Identification Number (EIN), insurance information, vehicle information, delivery fee, tip amount, gas allowance, dispatch name, and/or commission rate.

The delivery management module may generate reports for each driver's delivery day. The module may also allow a driver to be checked in to the system at the beginning of his or her shift, and receive the geographical zone that the driver is in. At the end of a driver's shift, the driver can be checked out of the system, and the module can calculate how much should be collected for the driver's delivery orders.

Menu Management Module

The menu management module 310 facilitates management of the take-out ordering menu of a restaurant. In an embodiment, the module 310 imports menu information from a POS server hosted at or for each restaurant or at a central location which serves multiple restaurant locations. This importation may occur over at least one network, including, for example, the Internet, and all communications may be encrypted (e.g., using SSL). In an embodiment, the menu information is continuously or periodically synchronized with the POS system of each restaurant utilizing the order management authority. The synchronization can be performed automatically or manually (e.g., in response to an administrator interaction with the menu management module 310 or other module). It should be noted that the synchronization between module 310 and the POS system may be one-way, in the sense that menu information stored in the order management authority 202 is updated in response to modifications to menu information in the POS system, but menu information in the POS system is not updated in response to modifications to menu information in the order management authority 202 (e.g., using menu management module 310). For example, changes to items, prices, screens, modifier groups, and the like, are periodically extracted by the order management authority 202, and may be pushed to web servers which dynamically generate web pages, such that changes in the menu data on the restaurant POS system are quickly reflected in the menus presented to CSRs and customers. In addition, new items which are added to the restaurant POS system are quickly available for arrangement and modification in the menu management module. Logs and reports can be maintained and utilized to identify changes in the menu data for review by administrators.

FIG. 20 illustrates the synchronization method, according to an embodiment. In step 2002, menu data is extracted or imported from a restaurant's POS system. The menu data may comprise, for each menu item, a name, a system identifier associated with the menu item (e.g., unique numeric or alphanumeric identifier), price, screen assignment, and/or modifier group assignment (e.g., cheese, temperature, condiments, etc.). The menu data is imported into one or more databases, such as database 208 of order management authority 202. In an embodiment, all information and relationships from the POS database are preserved during importation. For example, menu item names, system identifiers, prices, screen assignments, and modifier group assignments and requirements (e.g., for a menu item, customer must choose exactly one temperature, may choose unlimited pizza toppings, or choose two side items, etc.) may remain the same, such that the menu data in order management authority 202 mirrors the menu data in the POS system from which they were imported.

When menu data is imported from the POS system, the menu items may be structured in a particular arrangement and/or on a particular set of screens. In an embodiment, by default, this structure is initially maintained in the order management authority 202. In other words, the view of the menu, including its structure, arrangement, and menu items, that a CSR or customer would see (e.g., by interacting with the new order entry module 306) may initially be the same as the view that restaurant personnel would see when interacting with the restaurant's POS system.

In an embodiment, the menu management module 310 provides a user interface which enables administrators to perform adjustments to the menu data. For example, in step 2004, inputs may be provided which enable the administrator to add menu items, change the names of menu items, and modify or add descriptions to the menu items. Furthermore, additional information may be added to a menu item, such as ingredient information, nutritional information, and allergen information. In addition, one or more images may be added for each menu item. These adjustments may be subject to certain controls. For instance, in an embodiment, system identifiers, prices, and modifier group assignments cannot be changed.

In an embodiment, the menu management module 310 also provides a user interface which enables administrators to manage properties that control how menu items are displayed by a graphical user interface of the order management authority (e.g., by the new order entry module 306). For example, in step 2006, an administrator may add or remove screens from a user interface that is to be presented to CSRs and/or customers (e.g., by the new order entry module 306), as well as add or remove menu items and menu options to or from those screens. For instance, the menu data imported from the POS system may comprise a new salad item on a salad menu screen. Since the POS system is a management tool, rather than a marketing tool, it would likely not comprise a new menu items screen. Thus, an administrator can create a new menu items screen and add the new salad, as well as other new menu items, to the screen.

In addition, different menu screens can be presented based on an order channel. In an embodiment, the order channels may comprise a call center channel, an online channel, and/or a mobile channel. A module of the order management authority which receives orders, such as the new order entry module 306, can determine through which channel the order is being received. If the source of the order request is from a call center, the call-center-specific menu screens can be returned. Similarly, if the order request is received through a website, online-specific menu screens can be returned, and if the order request is received from a mobile device, mobile-specific menu screens can be returned. In an embodiment, the online-specific menu screens are formatted for standard browsers, whereas the mobile-specific menu screens are formatted for mobile browsers. In this manner, menu items which may not be applicable to a particular order channel can be removed from the menu screens used in that channel (e.g., raw fish items can be removed from take-out order channels).

In an embodiment, the menu management module 310 allows an administrator to sort the order of menu items as displayed to CSRs or customers. For example, the administrator may sort the menu items, such that popular or high-margin menu items are at the top of the menu screens.

The menu data imported from the POS system and adjusted and/or supplemented by an administrator, as discussed above, are stored in order management authority 202. For example, the menu data can be stored in database(s) 208.

In an embodiment, menus served to CSRs and/or customers are populated dynamically at the time that the menu is served (e.g., from the menu data in database(s) 208). For example, in embodiments which serve the menus via web pages, the menus can be served in dynamically generated web pages using Active Server Pages (ASP) or other dynamic web-page-generation technology (e.g., JavaServer Pages). In such an embodiment, a static page comprising the menu can also be available to be served by a web server of the order management authority in the event that the menu cannot be served dynamically, for instance, due to a connection failure or other error of the menu management module, database, or other component of the order management authority, or the restaurant POS system from which the menu information is imported. The static page can be updated periodically during normal operation of the order management authority.

In an embodiment, the menu management module 310 allows a company or restaurant administrator to add specials to the restaurant menu. These specials can be promoted during order entry and processing.

Figure 21A:
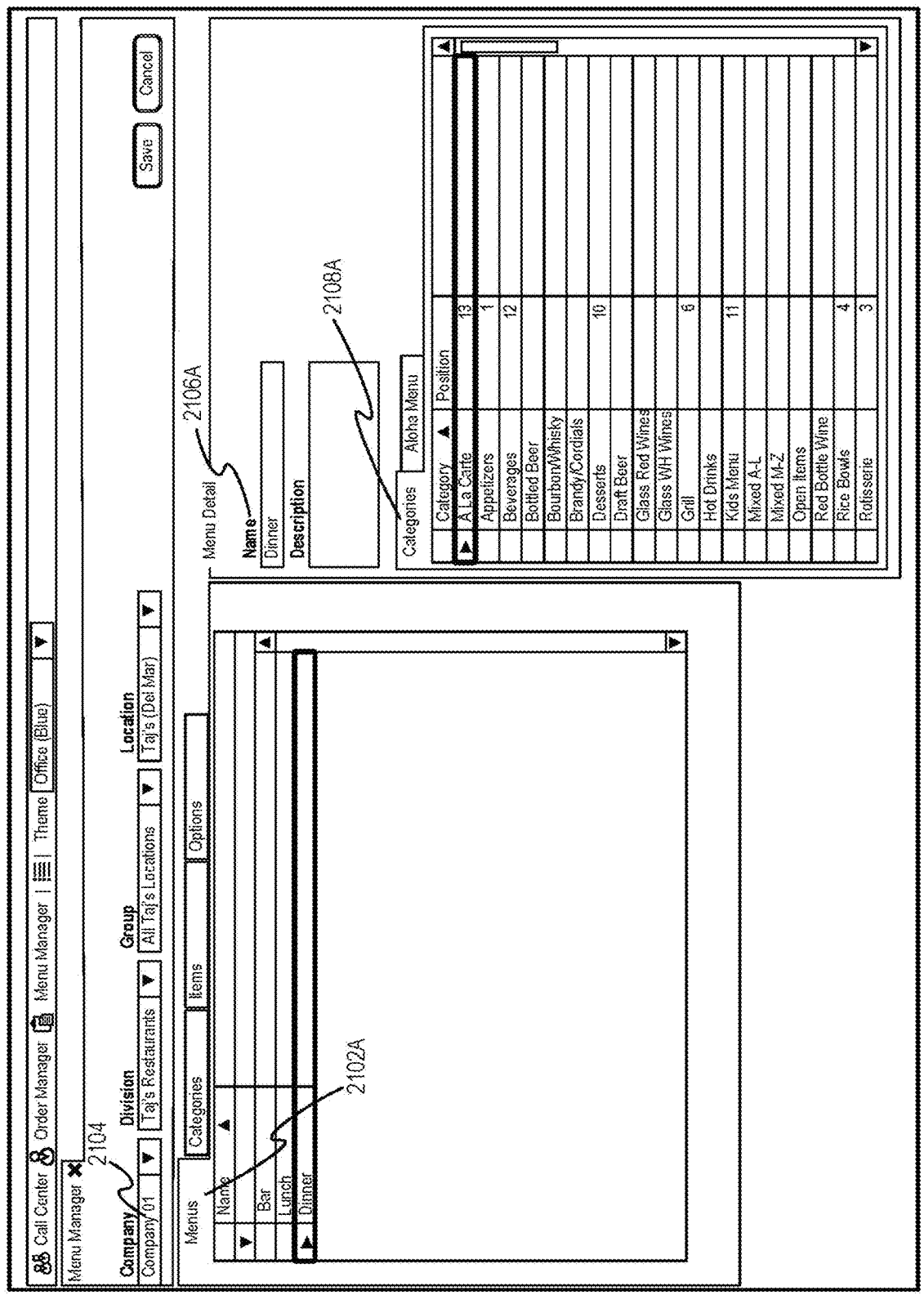

FIGS. 21A-21D illustrate an example graphical user interface, comprising multiple screens or tabs, which can be provided by or for the menu management module 310. FIG. 21A illustrates a tab which can be utilized to add, remove, modify, or otherwise manage one or more menus for a selected restaurant. As can be seen, a navigation menu 2104 can be provided with drop-downs for selecting locations within a group of restaurant locations, groups of restaurant locations within divisions of a company, and/or a company. A section 2102A displays all menus that have been created for the selected restaurant. Since a POS system will typically only have one menu, after an initial import from the POS system, only a single menu may exist. However, additional menus may be subsequently added (e.g., a breakfast menu, lunch menu, and dinner menu). The tab may further comprise a section 2106A which allows an administrator to edit information (e.g., menu name and description) associated with a selected menu. The selected menu may comprise one or more screens or "categories," which can be listed in section 2108A.

Figure 21B:
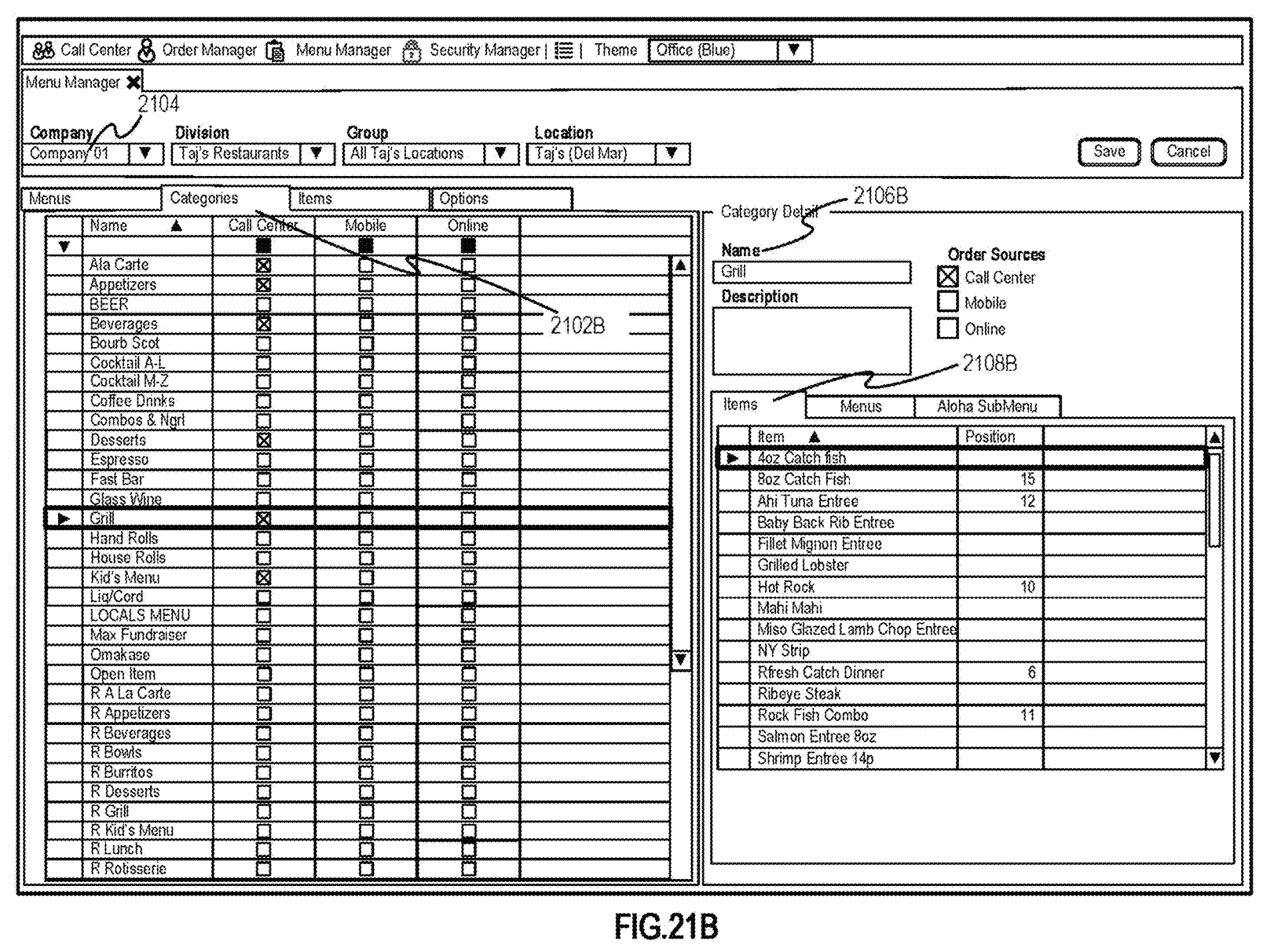

FIG. 21B illustrates a tab which can be utilized to add, remove, modify, or otherwise manage screens or categories, which may be associated with the one or more menus of a restaurant, as illustrated in FIG. 21A. A list of screens can be provided, as shown in section 2102B. Each screen can be associated with one or more inputs, such as binary inputs (e.g., checkboxes). In this embodiment, each binary input is associated with one of a plurality of order channels (e.g., call center, online, and mobile channels). In this manner, individual screens can be associated with one or more order channels, such that the screen will be visible to CSRs or customers requesting menu information via the associated order channels. The tab can further comprise a section 2106B which allows an administrator to edit information (e.g., screen name and description), and a section 2108B which lists the menu items associated with the screen selected in section 2102B. The menu items associated with the selected screen are those items which will be displayed on the screen when the screen is requested by CSRs or customers. The section 2108B may allow the administrator to sort or otherwise set the order in which the menu items will be displayed on the associated screen. The section 2108B may also allow an administrator to view which menus the selected screen is associated with.

Figure 21C:
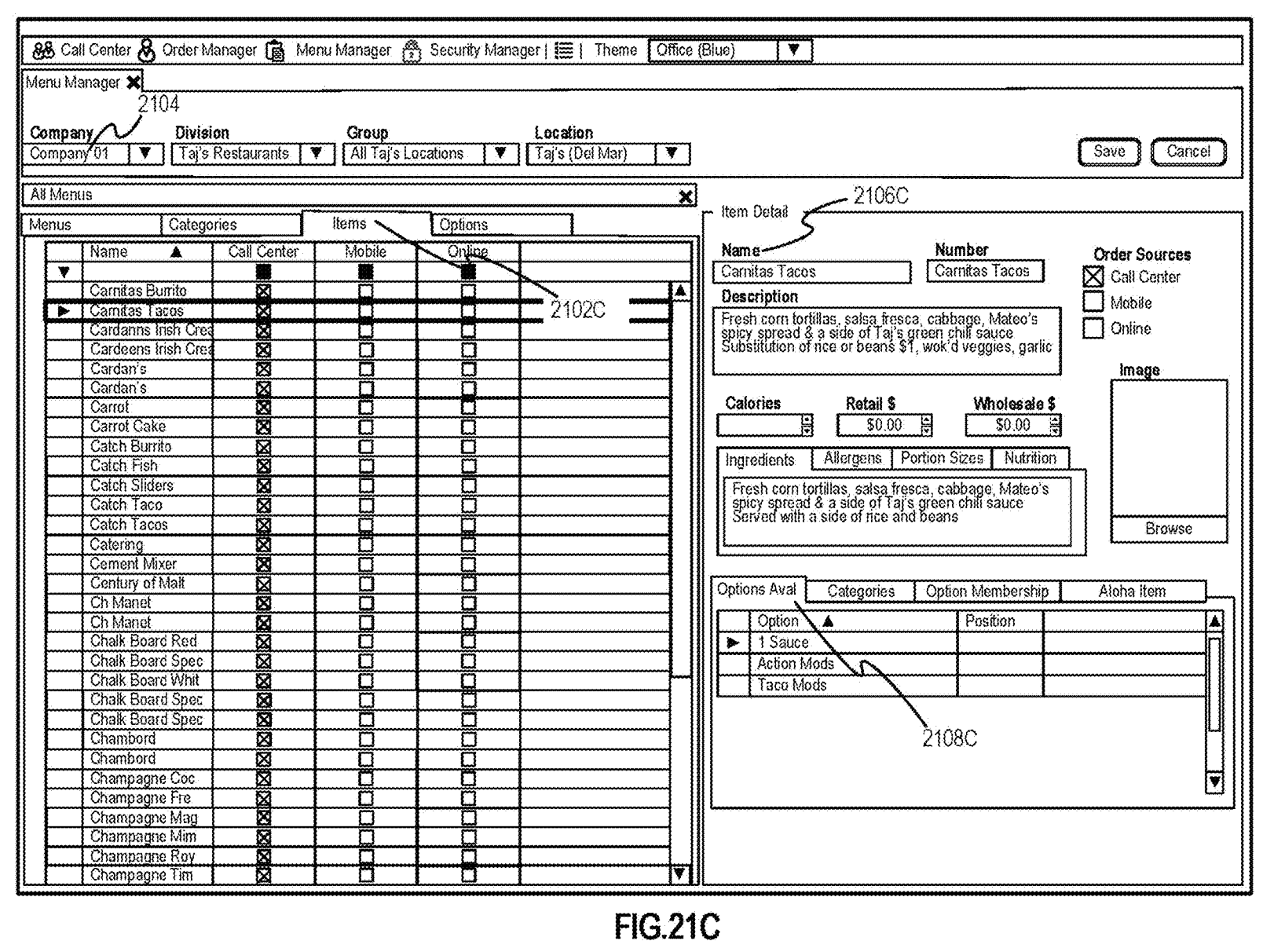

FIG. 21C illustrates a tab which can be utilized to add, remove, modify, or otherwise manage menu items, which may be associated with the one or more screens, as illustrated in FIG. 21B. A list of menu items can be provided, as shown in section 2102C. Each menu item can be associated with one or more inputs, such as binary inputs (e.g., checkboxes). In this embodiment, each binary input is associated with one of a plurality of order channels (e.g., call center, online, and mobile channels). In this manner, individual menu items can be associated with one or more order channels, such that the menu item will be visible to CSRs or customers requesting menu information via the associated order channels. The tab can further comprise a section 21060 which allows an administrator to edit information (e.g., menu item name and description). The section 21060 may also allow an administrator to edit information regarding calories, price, cost, ingredients, allergens, portion sizes, and/or nutrition associated with the selected menu item, as well as add one or more images to be associated with the menu item. In addition, the tab may comprise a section 2108C which lists the modifiers or options available for the menu item selected in section 2102C. The options available for the menu item are those options which will be presented to CSRs or customers if the menu item is selected during the ordering process. The section 21080 may allow the administrator to sort or otherwise set the order in which the options will be displayed. The section 21080 may also allow an administrator to view which screens or categories the selected menu item is associated with, and which modifier groups the selected menu item belongs to.

Figure 21D:
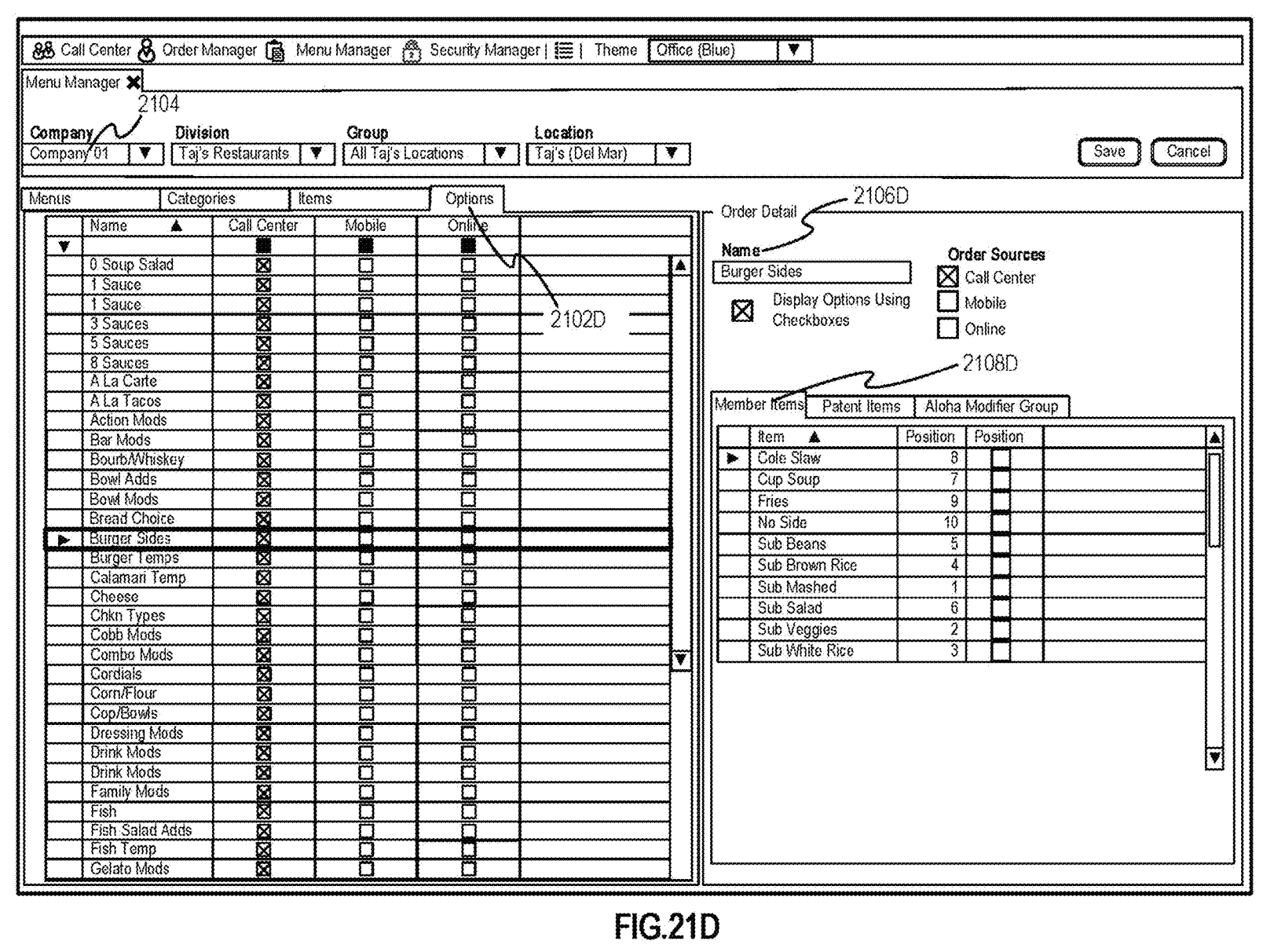

FIG. 21D illustrates a tab which can be utilized to add, remove, modify, or otherwise manage modifiers or options, which may be associated with the one or more menu items, as illustrated in FIG. 21C. A list of options can be provided, as shown in section 2102D. Each option can be associated with one or more inputs, such as binary inputs (e.g., checkboxes). In this embodiment, each binary input is associated with one of a plurality of order channels (e.g., call center, online, and mobile channels). In this manner, individual options can be associated with one or more order channels, such that the option will be visible to CSRs or customers requesting menu information via the associated order channels. The tab can further comprise a section 2106D which allows an administrator to edit information (e.g., option name and display format). In addition, the tab may comprise a section 2108D which lists the items available for the option selected in section 2102D. The items available for the option are those items which a CSR or customer may select for as option during the ordering process. The section 2108D may allow the administrator to sort or otherwise set the order in which the items will be displayed, as well as set a default item.

Report Management Module

The report management module 312 can generate reports related to usage of the order management authority. The module 312 can include an export function which exports ordering information and metrics to a file in one or multiple formats, including without limitation comma-delimited (CSV) and/or spreadsheet (e.g., Microsoft Excel®) formats. The report management module 312 can also generate reports. The reports can be displayed (e.g., in a web page), inserted as the body of an email and emailed, and/or stored as a file in Portable Document Format (PDF) or other format, for printing or attachment to an email. By way of illustration, and not limitation, the report management module 312 can be implemented to generate one or more of the following reports:

Sales Report. This report can list sales information, including without limitation total number of orders, average dollar amount per order, food sales, beverage sales, discounts/promotions used, sales tax, and/or restaurant/delivery fees. The report can show sales information for a specified date range (e.g., the current day, month-to-date, year-to-date, etc.), and by company, company group, or restaurant location.

Menu Item Report. This report can be used to identify which menu items are selling the most, and/or which are selling the least. For instance, the report may identify menu items and, for each menu item, identify number of items sold, total dollar amount sold, discounts/promotions used, total menu item cost, total profit in dollars, and total profit percentage. The report can show menu item sales information for a specified date range (e.g., the current day, month-to-date, year-to-date, etc.), and by company, company group, or restaurant location.

Order Types Report. This report can be used to identify how orders are placed. For example, the report may identify order information by order type. The order types can comprise phone orders, Internet orders, advanced orders, pick-up orders, curbside orders, and/or delivery orders. For each type of order, the report can identify the total dollar amount of food and/or beverage sales, average dollar amount, total profit in dollars, and/or total profit percentage. The report can show order type information for a specified date range (e.g., the current day, month-to-date, year-to-date, etc.), and by company, company group, or restaurant location.

Order Times Report. This report can be used to identify when orders are placed. For example, the report may identify order information by time of day. The times of day may be in the form of time periods, such as breakfast orders (e.g., 6:00 AM to 11:00 AM), lunch orders (e.g., 11:00 AM to 4:00 PM), and dinner orders (e.g., 4:00 PM to 11:00 PM). For each time period, the report can identify the total number of orders, average time taken to send the order, average time taken to confirm the order, average time that a driver is en route and/or at a restaurant, and/or the average time to complete an order. The report can show order time information for a specified date range (e.g., the current day, month-to-date, year-to-date, etc.), and by company, company group, or restaurant location.

User Roster Report. This report shows all users assigned to a client or company.

Restaurant Roster Report. This report shows all restaurants.

Menu Roster Report. This report shows all menu items with their cost and retail price.

Demographics Report. This report shows all customer information, including, for example, name, location, email address, and/or telephone number.

The report management module 312 may also allow administrators to configure or customize reports.

Example Ordering Processes

Figure 22:
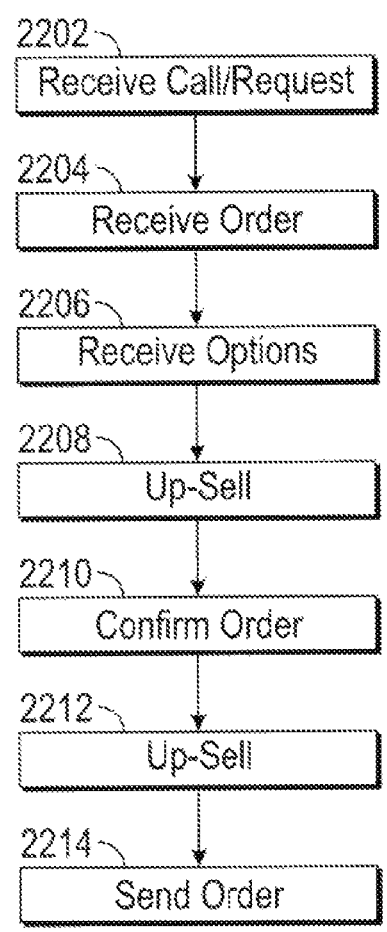
FIG. 22 illustrates an example process for completing a restaurant order, according to an embodiment.

FIG. 22 illustrates an example ordering process, according to an embodiment, which may be used, for example, with the systems and processes described herein. If the order is submitted via a call center, in step 2202, a telephone call is received from a customer by a CSR at the call center. In step 2204, the CSR receives order information from the customer and enters it into the order management authority (e.g., using the new order entry module 306). As the order information is entered, the CSR can be presented with options, such as available side dressings for a particular salad being ordered, available side dishes for a particular entrée being ordered, etc. In step 2206, the CSR reviews the options with the customer and enters the customer's selections.

As the CSR inputs order information, the CSR can be presented with up-selling options, special deals, and the like. For example, there may be a special on an appetizer, or the CSR can be prompted to ask the customer if they would like to add an appetizer or dessert to their order. In step 2208, these offers are communicated by the CSR to the customer. In step 2210, the entire order can be confirmed. In an embodiment, the CSR can be prompted again in step 2212 with respect to up-selling, for example, if a dessert or beverage has not been previously offered. In step 2214, the entire order can be sent to the restaurant (e.g., to its POS system).

In an alternative or additional embodiment, the order and options are input directly by the customer into a graphical user interface (e.g., provided by a web server or other application) and transmitted over a network, such as the Internet, to an order management module or other module or servlet. In this embodiment, instead of receiving a call in step 2202, the order management authority (e.g., a web server of the authority) receives a request for the menu information or a graphical user interface (e.g., one or more web pages) comprising selectable menu information. In steps 2204 and 2206, the customer enters or selects menu items and options using inputs (e.g., drop-downs, check-boxes, text boxes, text areas, radio buttons, links, etc.) of the graphical user interface.

As the customer is entering order information, up-sells, promotions, or other offers may be presented to the user via the graphical user interface (e.g., in separate screens, sections, pop-ups, frames, etc. of the interface). Up-selling may be attempted at step 2208, step 2212, or both steps 2208 and 2212. In step 2210, the customer is prompted to confirm the order, for example, using a button or link on a screen comprising the received order and options information. In step 2214, the order is submitted to the order management authority (e.g., using a POST request supported by the Hypertext Transfer Protocol (HTTP)), after which the order information may be transmitted to the restaurant.

Social Networking and Data Mining

In an embodiment, the order management authority 202 can be interfaced with or host a social networking site or community. Since, in certain embodiments, authority 202 will have information related to specific customers' ordering histories, habits, preferences, and the like, this information can be stored and made available to customers via the social networking site. The customers can access the social network to review the histories, preferences, etc. of themselves, as well as others in their social network. Customers can share all or portions of their order information with the social network or other customers. This shared information may be aggregated to determine the most ordered item, determine the most popular restaurant and/or restaurant location, rate restaurants and/or menu items, make recommendations, share experiences, and the like.

In an embodiment, order management authority 202 can provide customers with the ability to create and/or modify profiles, preferences, or both. This information can be used, for example, to influence up-selling recommendations and menu options presented to the customer (e.g., directly or via a CSR). All of this information and user interactions can be stored by system 200.

In fact, in certain embodiments, order management authority 202, or algorithms interfaced with or running on authority 202, can be configured to mine the data stored in databases 208 related to customer orders, selections, histories, times, and the like, in order to determine various information or metrics that can be used by system 200 to improve the experience of dining customers. For example, authority 202 can be configured to determine which menu items sell well and which do not, whether there is a temporal or geographic correlation with what sells and when, which up-sell suggestions work and which do not, which side order suggestions work and which do not, etc. This information can then be made available to clients of the order management system 202, either free of charge or for a fee. The clients may use this information to update menus and order flows. In certain embodiments, the updates are partially or wholly automated. Order management authority 202 can also use the information to offer discounts, coupons, specials, and the like, that are targeted to a specific user, thereby increasing the chance that the user will take advantage of the offer.

In an embodiment, the social network can be interfaced with other accounts belonging to customers (e.g., Twitter®, Facebook®, etc.), and capable of extracting information from these accounts. Data mining algorithms can include these accounts to further enhance the available information. Furthermore, various applications, APIs, portals, and the like, can be used to gather information, not only from customers of the authority 202, but also from their contacts (e.g., family, friends, acquaintances, etc.) and interactions with other websites which the customers visits and/or with which the customer has an account. Using this information as a resource enables rapid growth, dramatic expansion of services, and strong profitability, for example, through highly targeted consumer offers, paid advertising programs, effective use of partnering strategies with other companies, and rapid evolution o core business models to adopt emerging technologies and leverage company infrastructures and competencies.

In an embodiment, the order management authority 202 can also be configured to offer other services, such as reservation services, delivery services, and discount services, such as daily deals, flash sales, location-based specials, loyalty programs, exclusive offers, review programs, local recommendations, cooking and recipe sites or functions, food entertainment programming and content, etc. Not only can this create an integrated dining environment, but all of the information gathered through these programs can also be integrated and used by the system 200 and the algorithms described above.

Figure 23D:
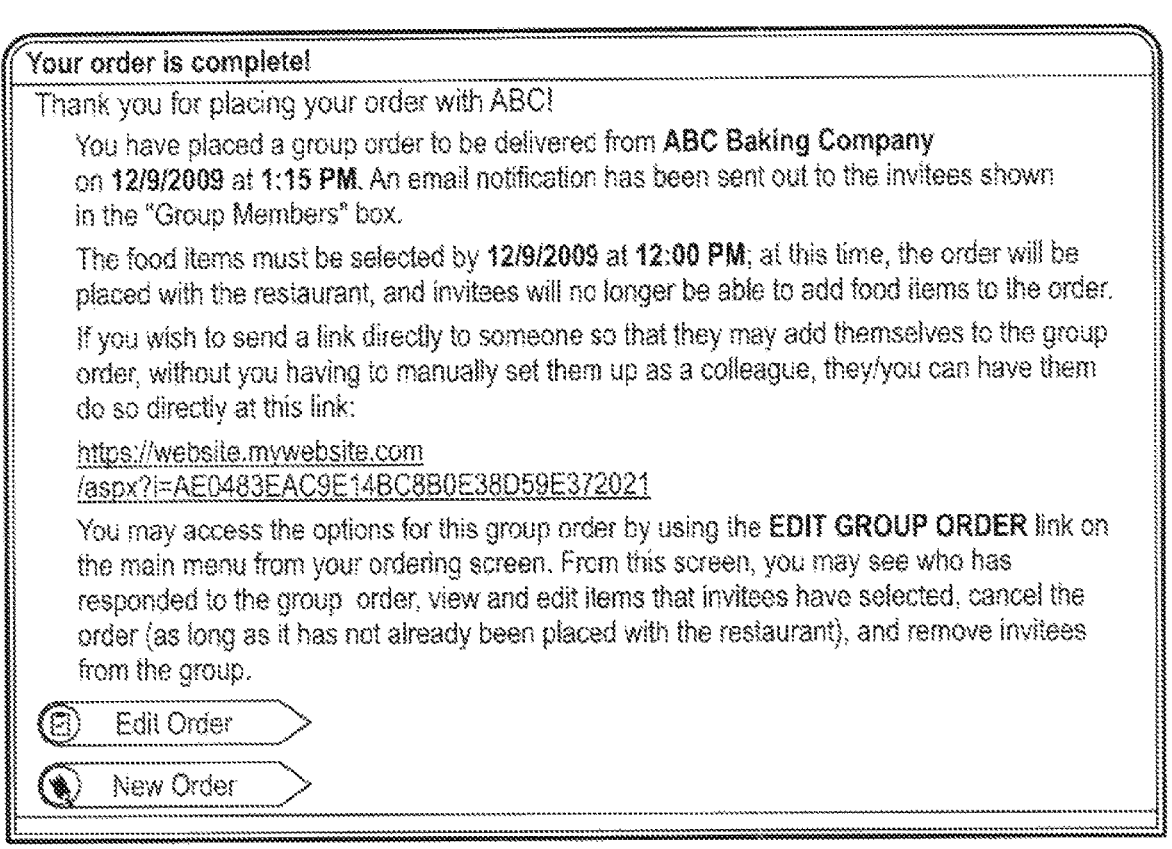

In an embodiment, the order management authority 202 can support group orders. FIGS. 23A-23D illustrate graphical user interfaces which enable a customer to create a group order. The graphical user interfaces can be provided by order management authority 202 (e.g., in a webpage), or can be provided by a client application executed on a customer's device (e.g., a mobile application on a mobile device). A customer can use the systems and methods disclosed above to add menu items to a group order, after which the customer may be shown a screen, such as the one in FIG. 23A. The screen displays details about the order, such as the restaurant, date and time for pick-up or delivery, an order cut-off time after which no more people may join the order, an invitation link which provides a link for an individual who wishes to add to the order, and/or an order total. The customer may also specify a per-person dollar limit, a payment distribution (pay for all items together, or each person pays for his or her own food, etc.), and/or a payment method (e.g., cash, credit card, etc.), as shown in FIG. 23B. In an embodiment demonstrated in FIG. 23C, the customer may also enter a message to be included in the invitation to the invitees.

In addition, the user interface provides an input or link for the customer to invite contacts to join the order, and lists the contacts which the customer has added to the invitation list. If a customer chooses to add an invitee, the customer may be provided inputs for entering contact information (e.g., name, email address, etc.) and/or a list of contacts can be pulled from an address book or other contact list. The contact list may be provided by order management authority 202 or may be pulled from a third-party site, such as an external social network (e.g., Facebook) or email application or site (e.g., Gmail, Yahoo Mail, etc.). The address book or contact list may be pulled from a third-party site using an API (e.g., Facebook Connect). Once the customer has selected all desired invitees, the customer may submit the group order, at which time invitations (e.g., emails) to join the group order may be sent to each of the invitees. An order confirmation can be displayed to the customer, as illustrated in FIG. 23D.

Figure 24A:
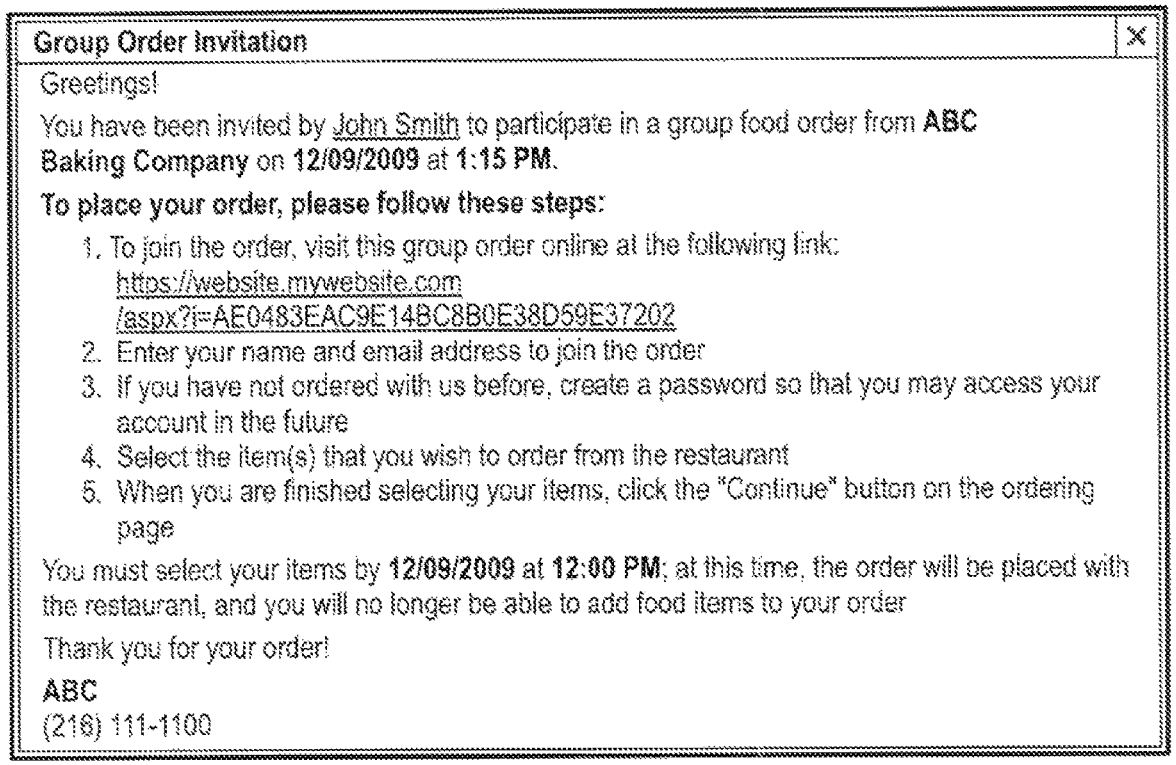
FIGS. 24A-24C illustrate example user interfaces for joining a group order, according to an embodiment.
Figure 24B:
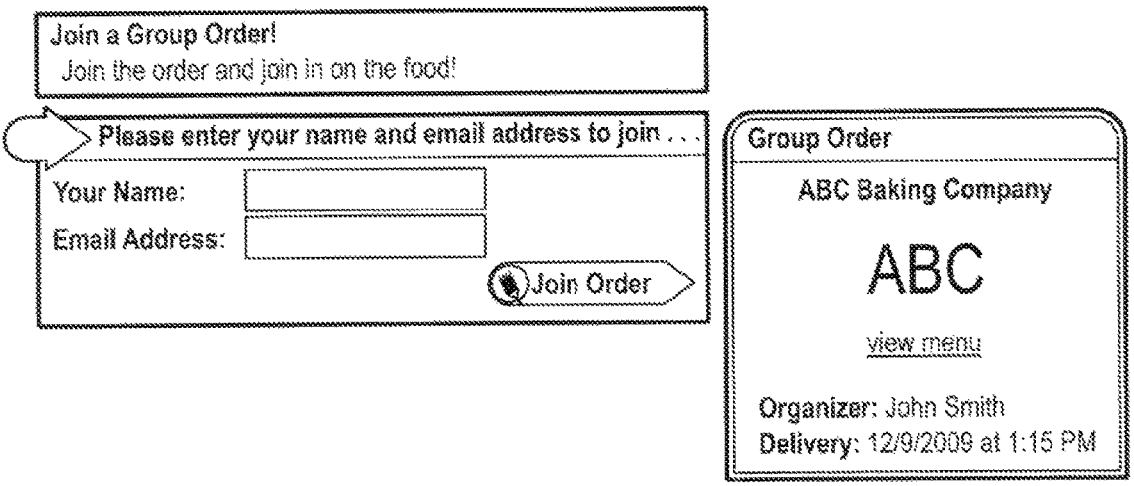
Figure 24C:
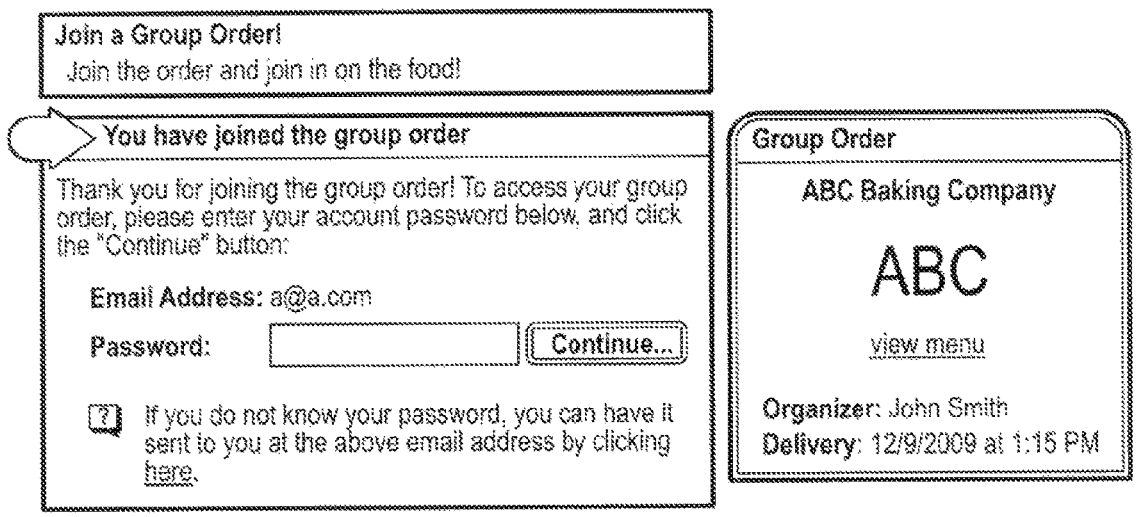

FIGS. 24A-24C illustrate graphical user interfaces which enable invitees to join a group order. As illustrated in FIG. 24A, a group order invitation can be sent to each of the invitees, for example, as an email to each invitee's email address. The invitation may include a link to a graphical user interface (e.g., via the new order entry module 306) for selecting menu items and joining the group order. The invitation may also include the name of the customer who initiated the group invitation, the selected restaurant, the time of pick-up or delivery, a cut-off time for joining the group order, and/or instructions for joining the group order.

If an invitee follows the link (e.g., URL) provided in the invitation shown in FIG. 24A, he or she may be taken to a user interface, which includes inputs for joining the order. For instance, the invitee may be able to select menu items and options. The invitee may also be required to provide personal information, like his or her name and email address, as shown in FIG. 24B. This information may be pre-populated based on parameters supplied in the query or parameter string of the link that was provided to the invitee in the invitation. In an embodiment, the invitee may be required to log in to or register with the order management authority 202 prior to joining a group order. As shown, in FIG. 24C, the members of the group order may be allowed to subsequently amend their orders by logging in to order management authority 202. However, in an embodiment, the order may no longer be amended following a specified cut-off time.

Order management authority 202 can be used as an engine to drive advertising revenues. For example, the authority 202 can employ banner advertisements on a portal site, customized restaurant-specific offers to targeted consumers, sponsored results in a restaurant search feature, fees for email and text marketing of special deals offered by specific restaurant brands to customers, and fees or participation revenue for chains to participate in daily deal or loyalty programs.

Figure 25:
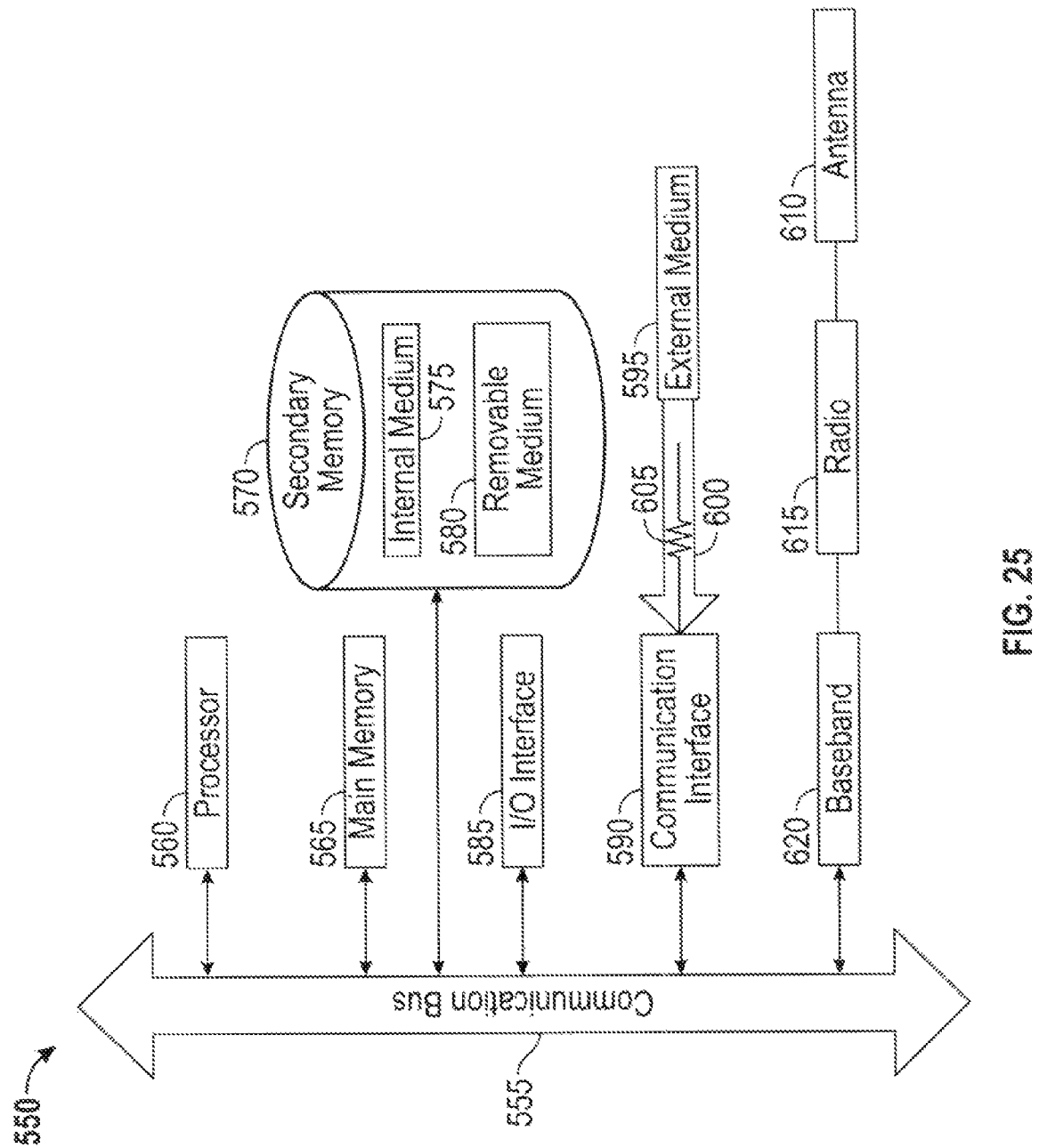
FIG. 25 illustrates an example device which can be used to implement the modules or functions disclosed herein, according to an embodiment.

FIG. 25 is a block diagram illustrating an example wired or wireless system 550 that may be used in connection with various embodiments described herein. For example the system 550 may be used as or in conjunction with one or more of the modules, as previously described with respect to FIG. 3. The system 550 can be a conventional personal computer, computer server, personal digital assistant, smart phone, tablet computer, vehicle navigation and/or control system, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560, such as one or more of the modules described above. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605.

The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that were previously described with respect to FIG. 3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent certain embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for automated take-out ordering, the system comprising:

at least one hardware processor; and at least one executable software module that, when executed by the at least one hardware processor causes the system to, import menu data from a plurality of restaurant Point-of-Sale (POS) systems over at least one network, the menu data including a plurality of menu items received from each of the plurality of POS systems, generate a menu user interface for each order channel of a plurality of order channels through which orders are received, each menu user interface having one or more menu screens including a subset of one or more of the plurality of menu items based on the menu data, wherein the menu user interface for at least one of the plurality of channels comprises at least some different, additional, or fewer menu items relative to the menu user interface for the remainder of the plurality of order channels, receive a request for the menu user interface from a user, and wherein generating the menu user interface comprises dynamically generating the menu user interface in response to the received request, receive a selection of at least one menu item from the subset of menu items over two or more order channels of the plurality of order channels, and send an order to the restaurant POS system for each of the two or more order channels over the at least one network, the order including the at least one menu item, wherein the plurality of order channels comprise a call center channel, an online channel, and a mobile device channel.

2. The system of claim 1, wherein the at least one executable software module further determines one or more up-sell options based on the selection of the at least one menu item, and provides the one or more up-sell options to the user.

3. The system of claim 2, wherein the order further comprises any of the one or more up-sell options selected by the user.

4. The system of claim 1, wherein the at least one executable software module further receives an assignment of the desired subset of menu items to at least one of the one or more menu screens.

5. The system of claim 4, wherein the at least one executable software module further receives additional information for one or more of the subset of menu items, the additional information comprising one or more of a name, a description, a price, a cost, ingredient data, nutritional data, allergen data, and an image.

6. The system of claim 1, wherein, in response to the selection of the at least one menu item, the menu user interface provides selectable menu options associated with the at least one menu item.

7. The system of claim 1, wherein the system further comprises at least one data storage device, and the at least one executable software module further:

receives customer information from the user;

receives restaurant information; and stores the customer information and restaurant information in the data storage device.

8. The system of claim 7, wherein the customer information comprises an order history of the user.

9. The system of claim 7, wherein the at least one executable software module determines one or more up-sell options based on one or more of the customer information and the restaurant information.

10. The system of claim 1, wherein the at least one executable software module periodically and automatically imports the menu data from the restaurant POS system over the at least one network.

11. The system of claim 1, wherein the at least one executable software module further shares at least a portion of the order on one or more social networking sites via at least one application programming interface.

12. The system of claim 1, wherein the at least one executable software module further:

receives a request for a group order from a first user;

receives a selection of at least one first menu item from the subset of menu items from the first user;

adds the at least one first menu item to the group order;

receives an identification of one or more contacts from the first user;

sends an invitation to join the group order to each of the one or more contacts;

for each of the one or more of the one or more contacts, receives a selection of at least one second menu item from the subset of menu items from the contact, and adds the at least one second menu item to the group order; and sends the group order to the restaurant POS system over the at least one network.

13. A method for automated take-out ordering, the method comprising, by at least one hardware processor:

importing menu data from a plurality restaurant Point-of-Sale (POS) systems over at least one network, the menu data including a plurality of menu items received from the plurality of POS systems;

generating a menu user interface for each order channel of a plurality of order channels through which orders are received, each menu user interface having one or more menu screens including a subset of one or more of the plurality of menu items based on the menu data, wherein the menu user interface for at least one of the plurality of channels comprises at least some different, additional, or fewer menu items relative to the menu user interface for the remainder of the plurality of order channels;

receiving a request for the menu user interface from a user, and wherein generating the menu user interface comprises dynamically generating the menu user interface in response to the received request, receiving a selection of at least one menu item from the subset of menu items over two or more order channels of the plurality of order channels, wherein the plurality of order channels comprise a call center channel, an online channel, and a mobile device channel; and sending an order to the restaurant POS system for each of the two or more order channels over the at least one network, the order including the at least one menu item.

14. The method of claim 13, further comprising:

determining one or more up-sell options based on the selection of the at least one menu item; and providing the one or more up-sell options to the user.

15. The method of claim 14, wherein the order further comprises any of the one or more up-sell options selected by the user.

16. The method of claim 13, further comprising receiving an assignment of the desired subset of menu items to at least one of the one or more menu screens.

17. The method of claim 16, further comprising receiving additional information for one or more of the subset of menu items, the additional information comprising one or more of a name, a description, a price, a cost, ingredient data, nutritional data, allergen data, and an image.

18. The method of claim 13, further comprising, in response to the selection of the at least one menu item, providing selectable menu options associated with the at least one menu item via the menu user interface.

19. The method of claim 13, further comprising:
receiving customer information from the user;
receiving restaurant information; and
storing the customer information and restaurant information in a data storage device.

20. The method of claim 19, wherein the customer information comprises an order history of the user.

21. The method of claim 19, further comprising determining one or more up-sell options based on one or more of the customer information and the restaurant information.

22. The method of claim 13, comprising periodically and automatically importing the menu data from the restaurant POS system over the at least one network.

23. The method of claim 13, further comprising sharing at least a portion of the order on one or more social networking sites via at least one application programming interface.

24. The method of claim 13, further comprising:
receiving a request for a group order from a first user;
receiving a selection of at least one first menu item from the subset of menu items from the first user;
adding the at least one first menu item to the group order;
receiving an identification of one or more contacts from the first user;
sending an invitation to join the group order to each of the one or more contacts;
for each of one or more of the one or more contacts, receiving a selection of at least one second menu item from the subset of menu items from the contact, and adding the at least one second menu item to the group order; and
sending the group order to the restaurant POS system over the at least one network.

* * * * *